United States Patent
Gao et al.

(10) Patent No.: US 12,333,653 B2
(45) Date of Patent: Jun. 17, 2025

(54) LOW-POLY MESH GENERATION FOR THREE-DIMENSIONAL MODELS

(71) Applicant: Tencent America LLC, Palo Alto, CA (US)

(72) Inventors: Xifeng Gao, Tallahassee, FL (US); Zhen Chen, Palo Alto, CA (US); Zherong Pan, Bellevue, WA (US); Kui Wu, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 161 days.

(21) Appl. No.: 18/112,445

(22) Filed: Feb. 21, 2023

(65) Prior Publication Data
US 2024/0296629 A1    Sep. 5, 2024

(51) Int. Cl.
| G06T 17/05 | (2011.01) |
| G06T 17/00 | (2006.01) |
| G06T 17/20 | (2006.01) |
| G06T 19/20 | (2011.01) |

(52) U.S. Cl.
CPC .......... *G06T 17/205* (2013.01); *G06T 17/005* (2013.01); *G06T 19/20* (2013.01); *G06T 2219/2004* (2013.01)

(58) Field of Classification Search
CPC ....... G06T 17/05; G06T 17/20; G06T 17/205; G06T 15/405; G06T 2219/2004; G06T 9/001; G06T 19/003; G06T 19/20; G06T 2210/36
See application file for complete search history.

(56) References Cited

U.S. PATENT DOCUMENTS

| 2003/0052875 | A1* | 3/2003 | Salomie | G06T 17/20 |
| | | | | 345/419 |
| 2021/0248829 | A1* | 8/2021 | Steinbrücker | G06T 7/187 |
| 2023/0120253 | A1* | 4/2023 | Li | G06T 19/20 |
| | | | | 345/423 |

OTHER PUBLICATIONS

Liu et al., "Seamless: Seam erasure and seam-aware decoupling of shape from mesh resolution," ACM Trans. Graph., Nov. 2017, vol. 36, No. 6, Article 216, 15 pages.

Lopes et al., "Improving the Robustness and Accuracy of the Marching Cubes Algorithm for Isosurfacing," IEEE Transactions on Visualization and Computer Graphics, Jan.-Mar. 2003, vol. 9, No. 1, pp. 16-29.

Lorensen et al., "Marching Cubes: A High Resolution 3D Surface Construction Algorithm," SIGGRAPH Computer Graphics, Jul. 1987, vol. 21, No. 4, pp. 163-169.

(Continued)

*Primary Examiner* — Hau H Nguyen
(74) *Attorney, Agent, or Firm* — ArentFox Schiff LLP

(57) ABSTRACT

According to an aspect of the disclosure, a method of generating a low-poly mesh for a three-dimensional (3D) model is provided. In the method, an edge-collapse operation is performed on each of a plurality of edges of an input mesh to generate a simplified mesh in which a number of faces of the input mesh is reduced by the edge-collapse operation. A position of at least one vertex of the simplified mesh is updated to generate an updated mesh in which a distance between the simplified mesh and the input mesh is reduced. The low-poly mesh is generated based on an aligned mesh in which positions of vertices of the updated mesh are optimized by minimizing a shape difference between the simplified mesh and the updated mesh.

18 Claims, 22 Drawing Sheets

(56) References Cited

OTHER PUBLICATIONS

Luan et al., "Unified Shape and SVBRDF Recovery using Differentiable Monte Carlo Rendering," Eurographics Symposium on Rendering 2021, 2021, vol. 40, No. 4, 13 pages.
Manson et al., "Isosurfaces Over Simplicial Partitions of Multiresolution Grids," EUROGRAPHICS 2010, 2010, vol. 29, No. 2, 9 pages.
Matveyev, Sergey V., "Approximation of Isosurface in the Marching Cube: Ambiguity Problem." Proceedings of the Conference on Visualization '94, IEEE, Oct. 1994, pp. 288-292.
Mehra et al., "Abstraction of Man-Made Shapes," ACM Trans. Graph., Dec. 2009, vol. 28, No. 5, Article 137, 10 pages.
Munkberg et al., "Extracting Triangular 3D Models, Materials, and Lighting From Images," Proceedings of the IEEE/CVF Conference on Comuter Vision and attern Recognition (CVPR), 2022, pp. 8280-8290.
Nan et al., "PolyFit: Polygonal Surface Reconstruction from Point Clouds," Proceedings of the IEEE International Conference on Computer Vision, 2017, pp. 2353-2361.
Nicolet et al., "Large Steps in Inverse Rendering of Geometry," ACM Trans. Graph., Dec. 2021, vol. 40, No. 6, Article 248, 13 pages.
Nielson et al., "The Asymptotic Decider: Resolving the Ambiguity in Marching Cubes," Proceeding Visualization '91, 1991, vol. 91, pp. 83-91.
Nielson, G.M., "On marching cubes," IEEE Transactions on Visualization and Computer Graphics, 2003, vol. 9, Issue 3, pp. 283-297.
Nielson, Gregory M., "Dual Marching Cubes," IEEE Visualization 2004, IEEE, 2004, pp. 489-496.
Portaneri et al., "Alpha Wrapping with an Offset," ACM Trans. Graph., Jun. 2022, vol. 41, No. 4, 22 pages.
Provot, Xavier, "Collision and self-collision handling in cloth model dedicated to design garments," Computer Animation and Simulation '97: Proceedings of the Eurographics Workshop in Budapest, Hungary, Sep. 2-3, 1997, pp. 177-189.
Sacht et al., "Nested Cages," ACM Trans. Graph., Nov. 2015, vol. 34, No. 6, Article 170, 14 pages.
Salinas et al., "Structure-aware mesh decimation," Computer Graphics Forum, 2015, vol. 34, No. 6, pp. 211-227.
Schaefer et al., "Dual Marching Cubes: Primal Contouring of Dual Grids," 12th Pacific Conference on Computer Graphics and Applications, IEEE, 2004, pp. 70-76.
Schaefer et al., "Manifold Dual Contouring," IEEE Transactions on Visualization and Computer Graphics, May-Jun. 2007, vol. 13, No. 3, pp. 610-619.
Shen et al., "Deep Marching Tetrahedra: a Hybrid Representation for High-Resolution 3D Shape Synthesis," 35th Conference on Neural Information Processing Systems (NeurIS 2021), Dec. 2021, pp. 6087-6101.
SimplyGon 9, Donya Labs AB, 2022. Retrieved from the Internet <URL:https://www.simplygon.com/Home/Index#sectionsolutions> 15 pages.
Unreal Engine 5, 2022, [retrieved from the Internet Mar. 12, 2023]. Retrieved from the Internet <URL:https://www.unrealengine.com/en-US/unrealengine-5>, 4 pages.
Van Den Bergen, Gino, "Efficient Collision Detection of Complex Deformable Models using AABB Trees," Journal of Graphics Tools, 1997, vol. 2, Issue 4, 13 pages.
Vega et al., "A Fast and Memory-Saving Marching Cubes 33 Implementation with the Correct Interior Test," Journal of Computer Graphics Techniques, 2019, vol. 8, No. 3, 18 pages.
Volino et al., "Efficient self-collision detection on smoothly discretized surface animations using geometrical shape regularity," Computer Graphics Forum, 1994, vol. 13, No. 3, pp. 155-166.
Wang et al., "A Large Scale Benchmark and an Inclusion-Based Algorithm for Continuous Collision Detection," ACM Trans. Graph., Sep. 2021, vol. 40, No. 5, Article 188, 16 pages.
Wang et al., "Accurate Self-Collision Detection Using Enhanced Dual-Cone Method," Computers and Graphics, 2018, vol. 73, pp. 70-79.
Wang et al., "Efficient and Reliable Self-Collision Culling using Unprojected Normal Cones," Computer Graphics Forum, 2017, vol. 36, No. 8, pp. 487-498.
Wei et al., "Approximate Convex Decomposition for 3D Meshes with Collision-Aware Concavity and Tree Search," ACM Trans. Graph., Jul. 2022, vol. 41, No. 4, Article 42, 18 pages.
Wyvill et al., "Data structure for soft objects," The Visual Computer, 1986, vol. 2, pp. 227-234.
Yang et al., "Unsupervised Learning for Cuboid Shape Abstraction via Joint Segmentation from Point Clouds," ACM Trans. Graph., Aug. 2021, vol. 40, No. 4, Article 152, 11 pages.
Chen, et al. "Robust Low-Poly Meshing for General 3D Models." ACM Trans. Graph., [retrieved on Nov. 21, 2023] Available online at: <URL: https://zhenchen-jay.github.io/uploads/RobustLowPoly.pdf>, vol. 1, No. 1, Article 1, Jan. 2023, pp. 1-20.
International Search Report and Written Opinion received for PCT Patent Application No. PCT/US2023/074520, mailed on Jan. 25, 2024, 8 pages.
De Araújo et al., "A Survey on Implicit Surface Polygonization," ACM Computer Surveys (CSUR), May 2015, vol. 47, No. 4, 39 pages.
Barill et al., "Fast winding numbers for soups and clouds," ACM Trans. Graph., 2018, vol. 37, No. 4, 12 pages.
Bauchet et al., "Kinetic Shape Reconstruction," ACM Trans. Graph., 2020, vol. 39, No. 5, 14 pages.
Bronnimann et al., CGAL 5.5.1—2D and 3D Linear Geometry Kernel: User and Reference Manual, 2022. Retrieved from the Internet: <URL:https://doc.cgal.org/5.5.1/Manual/packages.html#PkgKernel23>, 27 pages.
Calderon et al., "Bounding Proxies for Shape Approximation," ACM Trans. Graph., Jul. 2017, vol. 36, No. 4, 13 pages.
Chauve et al., "Robust Piecewise-Planar 3D Reconstruction and Completion from Large-Scale Unstructured Point Data," 2010 IEEE Computer Society Conference on Computer Vision and Pattern Recognition, IEEE, 2010, 8 pages.
Chen et al., "AUV-Net: Learning Aligned UV Maps for Texture Transfer and Synthesis," Proceedings of the IEEE/CVF Conference on Computer Vision and Pattern Recognition, IEEE, 2022, 99. 1465-1474.
Chen et al., "BSP-Net: Generating Compact Meshes via Binary Space Partitioning," Proceedings of IEEE/CVF Conference on Computer Vision and Pattern Recognition (CVPR), IEEE, 2020, pp. 45-54.
Chen et al., "Neural Dual Contouring," ACM Trans. Graph., Jul. 2022, vol. 41, No. 4, 13 pages.
Chen et al., "Neural marching cubes," ACM Trans. Graph., Dec. 2021, vol. 40, No. 6, 15 pages.
Chen et al., "On Visual Similarity Based 3D Model Retrieval," Computer Graphics Forum, Sep. 2003, vol. 22, Issue 3, pp. 223-232.
Chernyaev, E.V., "Marching Cubes 33: Construction of Topologically Correct Isosurfaces," GRAPHICON, Jul. 3-7, 1995, 9 pages.
Cignoni et al., "MeshLab: an Open-Source Mesh Processing Tool," Scarano et al. [Ed], Eurographics Italian Chapter Conference, 2008, pp. 129-136.
Cignoni et al., "Metro: measuring error on simplified surfaces," Computer Graphics Forum, 1992, vol. 17, No. 2, pp. 167-174.
Cohen-Steiner et al., "Variational shape approximation," ACM Trans. Graph., vol. 23, No. 3, pp. 905-914.
Custodio et al., "Practical considerations on Marching Cubes 33 topological correctness," Computers and Graphics, 2013, vol. 37, No. 7, pp. 840-850.
Diazzi et al., "Convex polyhedral meshing for robust solid modeling," ACM Trans. Graph., Dec. 2021, vol. 40, No. 6, 16 pages.
Zhou et al., "Thingi10k: A Dataset of 10,000 3D-Printing Models," arXiv:1605.04797v2, Jul. 2, 2016, 8 pages.
Durst, "Letters: additional reference to marching cubes," Computer Graphics, 1988, vol. 22, Issue 5, p. 243.
Fang et al., "Connect-and-Slice: an hybrid approach for reconstructing 3D objects," Proceedings of the IEEE/CVF Conference on Computer Vision and Patterns Recognition, 2020, pp. 13490-13498.
Fang et al., "Planar Shape Detection at Structural Scales," 2018 IEEE/CVF Conference on Computer Vision and Pattern Recognition, IEEE Computer Society, USA, 2018, pp. 2965-2973.

(56) References Cited

OTHER PUBLICATIONS

Gao et al., "Feature Preserving Octree-Based Hexahedral Meshing," Computer Graphics Forum, 2019, vol. 38, pp. 135-149.

Gao et al., "Low-Poly Mesh Generation for Building Models," ACM SIGGRAPH 2022 Conference Proceedings, Association for Computing Machinery, 2022, Article 3, 9 pages.

Garland et al., "Surface Simplification Using Quadric Error Metrics," Proceedings of the 24th Annual Conference on Computer Graphics and Interactive Techniques (SIGGRAPH '97), 1997, pp. 209-216.

Han et al., "Tight Normal Cone Merging for Efficient Collision Detection of Thin Deformable Objects," Eurographics—Short Paper, 2021, pp. 49-52.

Hasselgren et al., "Appearance-Driven Automatic 3D Model Simplification," Eurographics Symposium on Rendering, Apr. 8, 2021, 19 pages.

Heo et al., "FASTCD: Fracturing-Aware Stable Collision Detection," Proc. of the ACM SIGGRAPH / Eurographics Symposium on Computer Animation, 2010, 10 pages.

Hoppe, Hugues, "New Quadric Metric for Simplifiying Meshes with Appearance Attributes," Proceedings of the Conference on Visualization '99: Celebrating Ten Years, 1999, pp. 59-66.

Hoppe, Hugues, "Progressive Meshes," Proceedings of the 23rd Annual Conference on Computer Graphics and Interactive Techniques (SIGGRAPH '96), 1996, pp. 99-108.

Hu et al., "Fast Tetrahedral Meshing in the Wild," ACM Trans. Graph., Jul. 2020, vol. 39, No. 4, Article 117, 18 pages.

Hu et al., "Tetrahedral Meshing in the Wild," ACM Trans. Graph., Aug. 2018, vol. 37, No. 4, Article 60, 14 pages.

Huang et al. "$\ell$1-Based Construction of Polycube Maps from Complex Shapes," ACM Trans. Graph., Jun. 2014, vol. 33, Issue 3, Article 25, 11 pages.

Huang et al., "ManifoldPlus: A Robust and Scalable Watertight Manifold Surface Generation Method for Triangle Soups," May 2020, arXiv:2005.11621v1, 12 pages.

Hubbard, Philip M., "Interactive Collision Detection," Proceedngs of 1993 IEEE Research Properties in Virtual Reality Symposium, IEEE, 1993, 8 pages.

IsoEx, Botsch, Mario, Jul. 8, 2015, [retrieved from the Internet Mar. 12, 2023]. Retrieved from the Internet <URL:https://www.graphics.rwth-aachen.de/IsoEx/>, 1 page.

Jacobson et al., "libigl—A simple C++ geometry processing library," libigl, 2018, 8 pages.

Jiang et al., "Bijective Projection in a Shell," ACM Trans. Graph., 2020, vol. 39, Issue 6, Article 247, 18 pages.

Ju et al., "Dual contouring of hermite data," ACM Trans. Graph., Jul. 2001, vol. 21, Issue 3, pp. 339-346.

Ju et al., "Intersection-free Contouring on An Octree Grid," Proceedings of Pacific Graphics, 2006, vol. 2006, 8 pages.

Karras, Tero, "Maximizing Parallelism in the Construction of BVHs, Octrees, and k-d Trees," Proceedings of the Fourth ACM SIGGRAPH/Eurographics Conference on High-Performance Graphics (EGGH-HPG'12), 2012, pp. 33-37.

Kelly et al., "BigSUR: large-scale structured urban reconstruction," ACM Trans. Graph., Nov. 2017, vol. 36, Issue 6, Article 204, 17 pages.

Khan et al., "Surface Remeshing: A Systematic Literature Review of Methods and Research Directions," IEEE Trans. On Vis. And Comp. Graph., Aug. 14, 2020, 31 pages.

Kobbelt et al., "Feature sensitive surface extraction from vol. data," Proceedings of the 28th Annual Conference on Computer Graphics and Interactive Techniques, Aug. 2001, pp. 57-66.

Laine et al., "Modular Primitives for High-Performance Differentiable Rendering," ACM Trans. Graph., Dec. 2020, vol. 39, Issue 6, Article 194, arXiv.2011.03277v1, 14 pages.

Lescoat et al., "Spectral Mesh Simplification," Computer Graphics Forum, 2020, vol. 39, No. 2, pp. 315-324.

Lewiner et al., "Efficient Implementation of Marchings Cubes' Cases with Topological Guarantees," Journal of Graphics Tools, 2003, vol. 8, Issue 2, 11 pages.

Li et al., "Feature-preserving 3D mesh simplification for urban buildings," ISPRS Journal of Photogrammetry and Remote Sensing, 2021, vol. 173, pp. 135-150.

Liao et al., "Deep Marching Cubes: Learning Explicit Surface Representations," 2018 IEEE/CVF Conference on Computer Vision and Pattern Recognition, 2018, pp. 2916-2925.

Lindstrom et al., "Fast and Memory Efficient Polygonal Simplification," Proceedings of the Conference on Visualization '98, IEEE, 1998, pp. 279-286.

Lindstrom et al., "Image-Driven Simplification," ACM Trans. Graph., Jul. 2000, vol. 19, No. 3, pp. 204-241.

* cited by examiner

FIG. 9

LOW-POLY MESH GENERATION FOR THREE-DIMENSIONAL MODELS

TECHNICAL FIELD

The present disclosure describes embodiments generally related to computing methodologies, including mesh geometry models.

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Mesh is a ubiquitously employed representation of three-dimensional (3D) models for digital games. While a mesh with a large number of polygons (e.g., high-poly) are required to express visually appealing details of a 3D shape, rendering a low-poly approximation of the 3D shape at distant views is a typical solution to achieve real-time gaming experience, such as on low-end devices. High-polys, no matter whether they are manually created through a modeling software or automatically converted from constructive solid geometry (CSG) and implicit functions, often have complex topology and geometries, such as numerous components, high genus, non-manifoldness, self-intersections, degenerate elements, gaps, inconsistent orientations, etc. The complexities of the high-polys can pose significant challenges to the design of automatic low-poly mesh generation algorithms. In practice, artists still manually craft low-poly meshes to ensure that the low-poly meshes have small number of triangles and preserve the visual appearance of an original mesh as much as possible. However, multiple iterations of manual adjustments are often required to manually craft the low-poly meshes, which incurs intensive labor and prolonged project periods, and poses a bottleneck for the current fast-changing game industry. Thus, automatic approaches are highly desired to generate satisfactory low-polys.

SUMMARY

Aspects of the disclosure include methods, apparatuses, and non-transitory computer-readable storage mediums for computing methodologies. In some examples, an apparatus for generating mesh geometry models includes processing circuitry.

According to an aspect of the disclosure, a method of generating a low-poly mesh for a three-dimensional (3D) model is provided. In the method, an edge-collapse operation can be performed on each of a plurality of edges of an input mesh to generate a simplified mesh in which a number of faces of the input mesh can be reduced by the edge-collapse operations. A position of at least one vertex of the simplified mesh can be updated to generate an updated mesh in which a distance between the simplified mesh and the input mesh can be reduced. The low-poly mesh can be generated based on an aligned mesh in which positions of vertices of the updated mesh are optimized by minimizing a shape difference between the simplified mesh and the updated mesh.

In an example, the input mesh is an iso-surface mesh that is generated based on a plurality of iso-surfaces in a plurality of voxels of the 3D model, where the plurality of iso-surfaces is determined based on an iso-value.

In an example, the edge-collapse operation is performed on a first edge of the plurality of edges of the input mesh to generate the simplified mesh. Whether the simplified mesh meets a topology consistency is determined based on whether the simplified mesh is manifold and watertight, and has a same genus and a same number of components as the input mesh. In response to the simplified mesh meeting the topology consistency, whether the simplified mesh is free of self-intersection is determined. In response to the simplified mesh being free of self-intersection, whether a first distance between a sub-mesh of the input mesh and a sub-mesh of the simplified mesh is larger than an iso-value is determined. The sub-mesh of the input mesh includes faces adjacent to the first edge before the edge-collapse operation, and the sub-mesh of the simplified mesh includes faces associated with the first edge after the edge-collapse operation. In response to the first distance being less than the iso-value, whether a second distance is less than a third distance is determined. The second distance is determined between the sub-mesh of the input mesh and a reference mesh. The third distance is determined between the sub-mesh of the simplified mesh and the reference mesh.

In some embodiments, a first sub-mesh in the simplified mesh that includes at least one first face is determined. Each of the at least one first face is in contact with a vertex that is determined when the edge-collapse operation is applied on the first edge. A second sub-mesh in the simplified mesh is determined. The second sub-mesh includes a plurality of second faces, where each of the plurality of second faces shares at least one vertex of the first sub-mesh. A third sub-mesh is determined in the simplified mesh, where the third sub-mesh includes a plurality of third faces that are not included in the first sub-mesh and the second sub-mesh. A bounding volume hierarchy (BVH) tree data structure of the third sub-mesh is constructed based on a BVH Tree type. For each of the one or more first faces of the first sub-mesh, a closest face of the respective first face is determined in the third sub-mesh. Whether each of the one or more first faces of the first sub-mesh intersects the closest face of the respective first face is further determined.

In some embodiments, a target vertex is determined in the input mesh that is a closest vertex of a first vertex of the simplified mesh. A vector between the target vertex and the first vertex is determined. The vector is equal to a difference between a position of the target vertex and a position of the first vertex over a first constant value. The first vertex is updated based on the vector and the position of the first vertex.

In an example, to update the first vertex, the position of the first vertex is updated as a sum of (i) the position of the first vertex and (ii) a product of a second constant value and the vector. Whether a first face of the simplified mesh that includes the first vertex intersects at least one neighboring face in the simplified mesh is determined. In response to the first face intersecting the at least one neighboring face, the position of the first vertex is updated as a sum of (i) the position of the first vertex and (ii) a product of a third constant value, a half of the second constant value, and the vector. In response to the first face not intersecting the at least one neighboring face, the position of the first vertex is updated as a sum of (i) the position of the first vertex and (ii) a product of the third constant value, the second constant value, and the vector.

In some embodiments, the first constant value is 8, the second constant value is 1, and the third constant value is 0.95.

In some embodiments, an unnormalized face normal of a first face of a face union is determined. The face union includes faces in the updated mesh and contacts a first vertex of the updated mesh. A normal constant is determined based on a magnitude of the unnormalized face normal of the first face. A unnormalized face normal of a corresponding face to the first face in the simplified mesh is determined. The optimized position of the first vertex is further determined by minimizing an unconstrained quadratic function.

In an example, the unnormalized face normal of the first face is determined as a cross product of two face edges of the first face.

In an example, the unnormalized face normal of the corresponding face to the first face is determined as a cross product of two face edges of the corresponding face to the first face.

In an example, the unconstrained quadratic function is $$E(v) := \sum_{f \in N(v)} \left\| \frac{n(f)}{c_n} - \frac{\tilde{n}(f)}{\|\tilde{n}(f)\|} \right\|^2.$$

The $c_n$ is the normal constant, $N(v)$ is the face union, $n(f)$ is the unnormalized face normal of the first face, and $\tilde{n}(f)$ is the unnormalized face normal of the corresponding face to the first face.

In some embodiments, a vector between a position of the first vertex and the optimized position of the first vertex is determined. The first vertex is further updated based on the determined vector to generate the aligned mesh.

In some embodiments, an iteration process is performed to generate the low-poly mesh. In response to one of (i) an iteration number of the iteration process being less than a target value, and (ii) a Hausdorff distance between the input mesh and the aligned mesh being less than a threshold value, an edge-collapse operation is performed on each of a plurality of edges of the aligned mesh to generate another simplified mesh.

According to another aspect of the disclosure, an apparatus is provided. The apparatus has processing circuitry. The processing circuitry can be configured to perform any one or a combination of the methods for generating the low-poly mesh.

Aspects of the disclosure also provide a non-transitory computer-readable medium storing instructions which when executed by at least one processor cause the at least one processor to perform any one or a combination of the methods for generating the low-poly mesh.

BRIEF DESCRIPTION OF THE DRAWINGS

Further features, the nature, and various advantages of the disclosed subject matter will be more apparent from the following detailed description and the accompanying drawings in which:

FIG. 9 shows exemplary comparisons of different methods for generating a low-poly mesh in accordance with some embodiments.

DETAILED DESCRIPTION OF EMBODIMENTS

Figure 8:
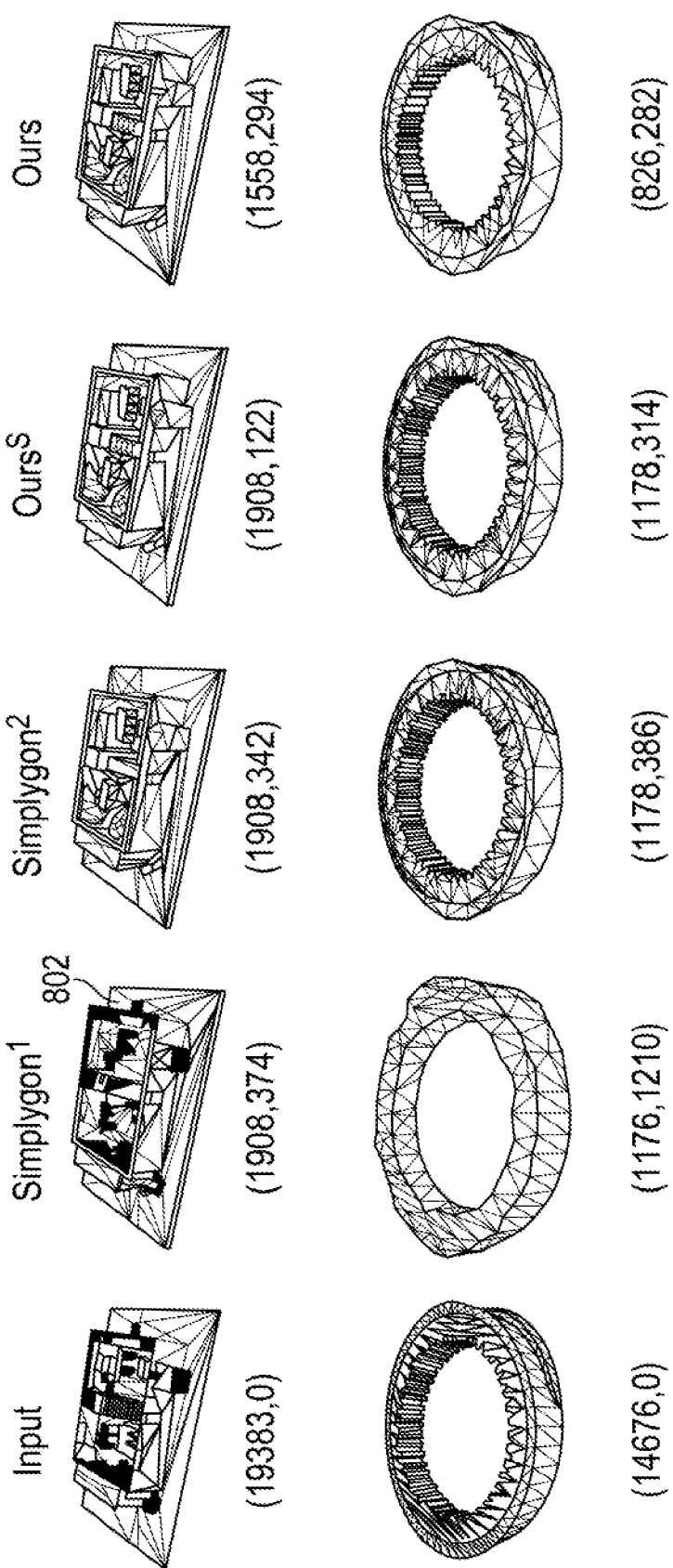
FIG. 8 shows exemplary comparisons of different methods for generating a low-poly mesh in accordance with some embodiments.

Over the past decades, various types of automatic methods have been developed to obtain a mesh with a reduced element count. Two types of automatic methods include (1) mesh reduction, which progressively reduces a number of triangles through an iterative application of local operations or clustering, such as edge-collapse and triangle clustering; and (2) re-meshing, which ignores an original mesh structure and generates a new mesh from scratch. While these mesh reduction methods can maintain attributes defined on a mesh surface (e.g., a UV map and textures), local operations of the mesh reduction methods rely on existing mesh vertices and connectivity. As a result, the mesh reduction methods may not be able to simplify meshes with excessive topology complexity, such as the meshes illustrated in FIGS. 9 and 10. On the other hand, the re-meshing approaches seek to represent an original mesh with a proxy mesh and simplify the proxy mesh via a row (or a number of) of different techniques. For example, the re-meshing approaches can include a polygonal mesh construction by a plane fitting and a mixed-integer optimization, a cage mesh generation through a voxel dilation and a mesh simplification, a shape abstraction by feature simplification, an extremely low-poly meshing using visual-hull boolean operations, a mesh simplification through differentiable rendering, an enclosing mesh generation through alpha-wrapping with an offset, and learning based approaches. However, these re-meshing approaches either rely on heavy user interactions, which need careful tweaking of parameters, or work for limited types of models. Commercial software (e.g., Simplygon) also have low-poly mesh functions, but the commercial software generate unsatisfactory results in many cases. For example, as shown in FIG. 8, Table 4, and Table 5, low-poly meshes can be generated using different low-poly construction modules based on Simplygon. Simplygon either fails to guarantee geometrical properties, such as free of intersection, or leads to a bad visual artifact. Thus, it remains to be a challenging task to automatically and robustly generate low-poly meshes for general 3D models used in industry.

Obtaining a low-poly mesh has been a focus of research in computer graphics for several decades. Early works use various mesh reduction techniques that directly operate on original inputs through iterative local element removal operations. Examples include geometric error-guided techniques, a structure-preserving-constrained technique, a volume-preserving technique, an image-driven technique, or the like. Clustering-based approaches can provide another direction for reducing the element count. The approaches mentioned above are well recognized in game production pipelines. However, the above approaches are better suited for reducing a mesh size of the original models to a medium level, such as reducing a number of faces by 20%-80%. Unfortunately, for 3D graphics applications running on lower-end devices, a much coarser low-poly mesh is desired. Such extremely low-poly meshes require topological and geometrical simplifications that are beyond the capabilities of the related mesh reduction techniques.

Unlike mesh reduction techniques, a parallel effort, such as re-meshing, aims to completely reconstruct a new mesh mimicking the original mesh. Related methods vary drastically in techniques. The methods to completely reconstruct a new mesh mimicking the original one can be classified by a main feature of the methods, such as voxelization-based re-meshing, primitive fitting, visual-driven, and learning-based.

In voxelization-based re-meshing, a voxelization of raw inputs can be performed to obtain a clean voxel surface. In a related example, a feature-guided re-triangulation, a deformation, and a curve-network cleaning are required to generate shape abstractions for architecture-like objects. Input meshes can come with a clear separation of an inside space and an outside space and heavily depend on user interactions to generate the final low-polys.

In primitive fitting, various primitives can be composed to fit an object. In related examples, a set of planes can be computed to approximate patch features detected in point clouds or 3D shapes, and then a faithful subset of the intersecting planes can be selected to obtain desired meshes. However, key challenges of the related examples include: (1) properly computing a suitable set of candidate planes is already a hard problem by itself, and (2) the complexity of the resulting mesh is highly unpredictable, which may require much trial-and-error to find a possibly good set of parameters. Works using other primitives, such as boxes, convex shapes, curves, etc., have also been explored, but none of the works has been specifically dedicated for generating low-polys.

In visual-driven approaches, differentiable rendering rises as a hot topic that enables continuous optimization of scene elements through guidance of rendered image losses. However, most of the visual-driven approaches require an initial mesh that is typically an uniformly discretized sphere. A key obstacle for generating low-polys via differentiable rendering is that a mesh reduction cannot be modeled as a differentiable optimization process. Although analysis-by-synthesis type of optimizations can be employed, the Laplacian regularization term used by most differentiable rendering techniques can derive a mesh far from the ground truth in an extreme low-poly setting. A visual hull-based approach has been recently proposed to generate extremely low-polys for building models, however, the visual hull-based approach not only creates sharp creases for organic shapes, but also has difficulty determining a target element number of the desired low-poly.

In learning-based methods, a popularly used 3D mesh reconstruction pipeline includes three steps: plane detection, intersection, and selection. In a related example, by converting low-polys to a binary space partition (BSP)-net, the low-polys can be extracted from images. However, the related example shares common shortcomings of the learning-based approaches. For example, a large dataset is required for network training, and the learned model works only for meshes of a similar type. The related example further requires voxelizations of the dataset to have well-defined in/out segmentation. Furthermore, the generated meshes inherit issues of polyfit-like approaches. For example, sharp creases are created that are not present in the high-poly, and parameter tuning is difficult. In another related example, by embedding a neural net of marching tetrahedral into a differentiable rendering framework, meshes and materials can be simultaneously optimized. Through controlling a rendered image resolution, 3D models can be generated in a LOD manner.

A marching cubes (MC) algorithm was proposed for reconstructing iso-surfaces from discrete signed distance fields. Related works include solving ambiguities of tessellations in each cube. One of the methods of MC is MC33, which enumerates all possible topological cases based on a trilinear interpolation in a cube. Related works of MC33 including resolving nonmanifold edges in the initial MC33 method. For example, MC33 was correctly implemented after defective issues of previous implementations are resolved. However, none of the related examples is able to recover sharp features.

To capture sharp features of an iso-surface, an extended marching cubes method (EMC) can be used to insert additional feature points, given that normals of some intersection points are provided. Dual contouring (DC) adapted the use of additional feature points with Hermite data (e.g., the gradient of the implicit surface function). In the dual contouring approach, one dual feature point can be inserted inside a cube and then dual feature points can be connected to form an iso-surface. DC does not need to perform edge-flip operations, but often generates non-manifold surfaces with many self-intersections. Although the non-manifold issue and the self-intersection issue can be addressed in related methods, none of the related methods solve both the non-manifold problem and the self-intersection problem simultaneously. Dual Marching Cubes (DMC) considers that a dual grid aligns with features of an implicit function, and extracts an iso-surface from the dual grid. DMC can preserve sharp features without excessive grid subdivisions as required by DC. However, DMC still does not guarantee that a generated mesh is free of self-intersection. In a related approach, to avoid the self-intersections, each cube can be subdivided into 48 tetrahedra, and then marching tetrahedra (MT) can be applied to extract the iso-surface. This approach can solve the problems in the DMC approach, but the division of 48 tetrahedra, together with the employed octree-structure, makes the algorithm either generate an overly dense mesh or requires trial-and-error for suitable octree depth parameter settings. Recently, an algorithm was proposed to generate watertight and orientable surfaces that strictly enclose an input. An output can be obtained by refining and carving the 3D Delaunay triangulation of an offset surface. However, the output misses the feature-preserving property.

Other learning-based approaches for iso-surface extraction can include deep marching cubes and deep marching tetrahedra. The deep marching cubes and/or deep marching tetrahedra can learn differential MC and MT results. However, none of the deep marching cubes and deep marching tetrahedra can capture sharp features of an initial surface. Neural marching cubes and neural dual contouring can train a network to capture sharp features without requiring extra Hermite information. However, the neural marching generates self-intersected meshes, and the neural dual contouring leads to non-manifold results.

In Table 1, various exemplary methods are summarized. Strengths and weakness of the various methods are provided in terms of topology and geometry properties: manifoldness, free of self-intersection, and sharp feature preservation.

conservatively perform intersection checks for triangles in a local region. A normal cone test contains two conditions: a surface normal test and a contour test. A surface can be determined as free of intersections when both tests are passed. While the surface normal test is fast to evaluate, the contour test requires a 2D loop projection and self-intersection checks over the entire loop that is expensive to compute. The related approaches of the normal cone, such as a dual normal cone test and/or an enhanced dual normal cone test, only mitigate issues of the normal cone test.

In the disclosure, the contour test can be skipped for the normal cone test if a mesh is manifold, watertight, and only updated after an edge-collapse operator and an edge flip operator. The skip of the contour test can speed-up the self-intersection checks by over 100×, which can be shown in Table 2 and Table 3, for example.

In the disclosure, a re-meshing approach is provided to generate low-poly meshes without human intervention. The method of the disclosure can be seamlessly integrated into mesh-based 3D asset production pipelines. The method of the disclosure can include (1) a robust iso-surface mesh extraction algorithm that ensures an output is watertight, manifold, self-intersection free, and feature-preserving; and (2) a progressive mesh flow process that brings two meshes close to each other, which produces a required low-poly with a high visual similarity as the input. A simplicity of the low-poly can be controlled by a target rendering screen size and an iso-surface offset. For example, decreasing the screen size and increasing the offset both can lead to low-polys with small element counts and larger geometric deviations from the original model. The method of the disclosure was

TABLE 1

A summary of the related methods

| Method | Manifold | Self-Intersection free | Sharp feature preserving |
|---|---|---|---|
| Marching Cubes | ✓ | ✓ | x |
| Marching Cubes33 | ✓[1] | ✓ | x |
| Marching Tetrahedrons | ✓ | ✓ | x |
| Extended Marching Cubes | ✓ | x | ✓ |
| Dual Contouring | x | x | ✓ |
| Manifold Dual Contouring | ✓ | x | ✓ |
| Scott Schaefer and Warren | x | ✓ | ✓ |
| Manson and Schaefer | ✓ | ✓ | ✓ |
| Portaneri et al. | ✓ | ✓ | x |
| Deep Marching Cubes | ✓ | x | x |
| Deep Marching Tetrahedrons | ✓ | x | x |
| Neural Marching Cubes | ✓ | x | ✓ |
| Neural Dual Contouring | x | ✓ | ✓ |

Determining self-intersections within a mesh can be considered as a discrete collision detection (DCD) between nonadjacent triangles at a static time, which is technically easy to compute but can be difficult to compute quickly. Various continuous collision detection (CCD) methods have been provided for checking any collisions between objects within a period of time. For example, self-intersection checks can be applied to determining any self-intersections within a mesh.

To quickly determine if a mesh has self-intersection, a key point is to cull unnecessary triangle pair checks in a conservative way but as tight as possible, and only conduct an intersection computation of triangles as few times as possible. While bounding volume hierarchy (BVH) is employed to reject intersection checks for triangles that do not share any vertex or edges, an approach of normal cone and related approaches of the normal cone have been introduced to evaluated based on several datasets containing models created by practitioners in different domains, with varying topologic and geometric complexities. Compared to state-of-the-art approaches and widely used software, the method of the disclosure demonstrates an improvement in terms of an element count, a visual quality, geometry, and/or topology guarantees of the generated low-polys.

For a mesh with arbitrary topology and geometry properties, the re-meshing approach of the disclosure can generate low-polys (or low-poly meshes) to strike a good balance between a mesh simplicity and a visual appearance preservation, with a requirement of being manifold, watertight, and free of self-intersection. In an embodiment, the re-meshing approach of the disclosure can include two stages. In the first stage, an unsigned distance field for an input can be built and an iso-surface extraction method can be introduced for an offset distance (or an iso-value) d. The iso-surfacing approach of the disclosure can meet the requirement of being manifold, watertight, and free of self-intersection while preserving shape features of input meshes. In the second stage, three steps can be performed sequentially. The tree steps can include a mesh simplification, a mesh flow process, and a feature alignment, to reduce an element count and bring the simplified mesh close to the input. The three steps are local steps so that any step that violates hard constraints can be easily rolled back or skipped. Based on the re-meshing approach of the disclosure, two crucial goals can be achieved: (1) the topology and intersection-free guarantees; and (2) a practically small silhouette difference between the simplified mesh and the input mesh.

In some embodiments, the algorithm of the disclosure requires only a single parameter from users, which can be a number of pixels, $n_p$, taken along the diagonal length l of a bounding box of an input mesh when the bounding box is rendered on a screen. A visual appearance of a 3D shape can mainly be determined by a silhouette of the 3D shape and a surface normal of the 3D shape. A visual preservation of an output of the algorithm can be indirectly enforced by mapping $n_p$ to d through a simple function ($d=l/n_p$). Thus, a maximum silhouette difference between the simplified mesh and the input mesh can be constrained within d, and an average normal difference between the mesh before and after simplification can be minimized based on the mesh flow process.

In the disclosure, a robust and automatic algorithm can be constructed. The effectiveness of the algorithm for producing low-polys with low triangle counts and high visual quality can be demonstrated by comparing with state-of-the-art methods and popularly used software through batch-processing several datasets containing 3D models with varying complexities. The comparison results can be shown in FIGS. 8-10 and tables 4-5, for example.

Figure 1:
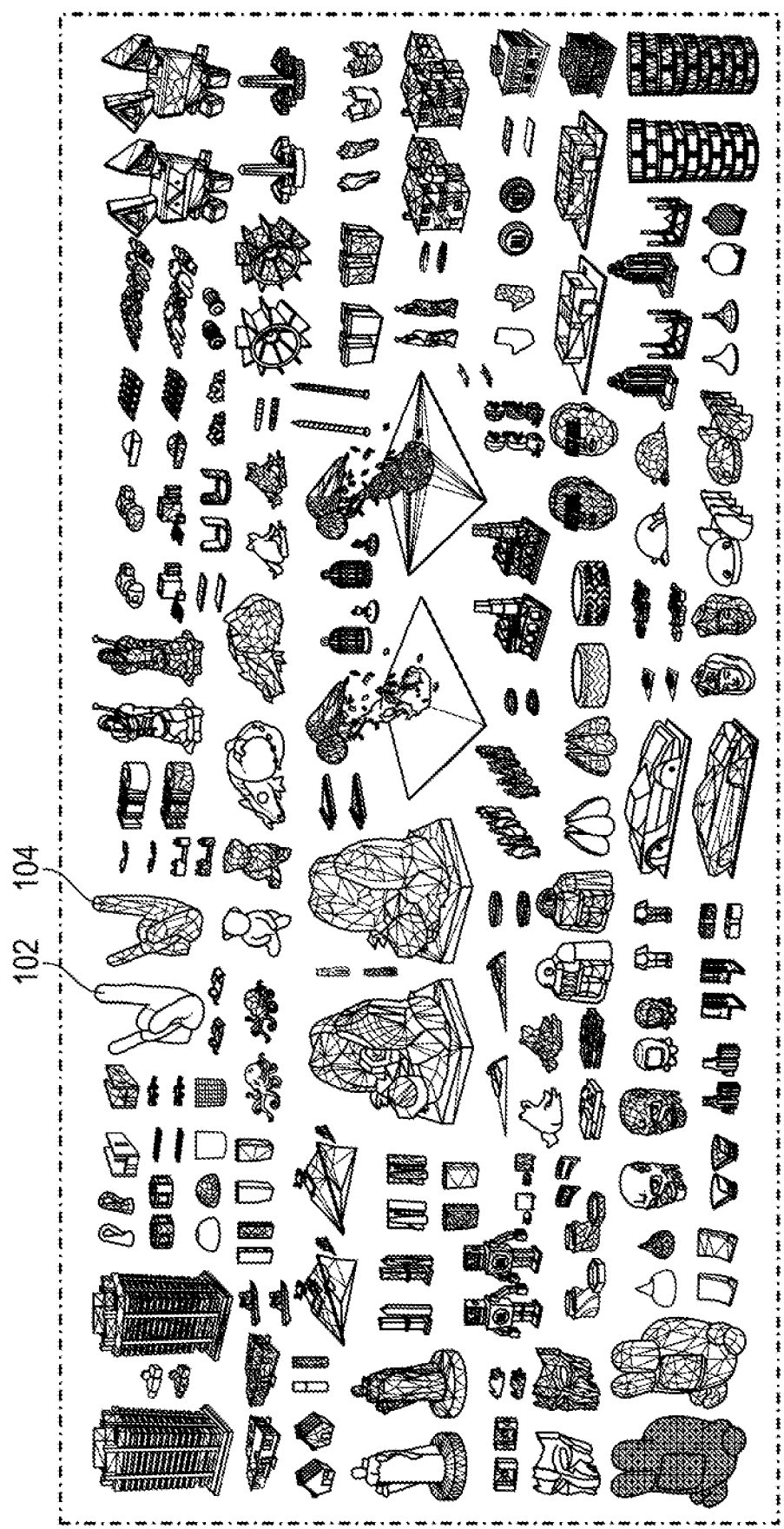
FIG. 1 shows examples of high-poly meshes and corresponding low-poly counterparts of the high-poly meshes.

FIG. 1 shows a plurality of exemplary three-dimensional (3D) models that are processed based on methods of the disclosure. The 3D models can be used in various environments, such as virtual reality and gaming applications. As shown in FIG. 1, a gallery of high-poly input meshes (e.g., (102)) and corresponding low-poly outputs (e.g., (104)) that are generated based on the method of disclosure are provided. The low-poly meshes can be water-tight and free of self-intersection.

In the disclosure, given an input of a polygonal mesh $M_i$, a maximum number of screen size pixels $n_p$ taken by the input, and an optionally user-specified target number of triangles $n_F$, a triangle mesh $M_o$ can be generated with properties as follows:

(1) The number of triangles of $M_o$ is either as small as possible or equal to $n_F$ if $n_F$ is provided as a parameter;
(2) $M_o$ is indistinguishable from $M_i$ when rendered at a view distance so that the number of pixels taken along the diagonal of the bounding box of $M_i$ is smaller than $n_p$;
(3) $M_o$ is both topologically and geometrically clean, e.g., watertight, manifold, and intersection-free; and
(4) $M_o$ preserves sharp features of $M_i$ as much as possible.

The first three properties of $M_o$ ensure rendering quality and enable any downstream processing on the $M_o$ to have a high computational efficiency, requiring no mesh repairing steps. The last property is a relatively soft requirement, which is often desired by artists and is also important for achieving the visual appearance preservation of $M_i$.

Several principals can be followed to design the re-meshing approach of the disclosure: (1) no assumptions are made on topologic or geometric properties of the input, which allows the re-meshing approach to handle any models created in the wild (or with many details); (2) an interior-point optimization-like strategy can be adopted to realize the above-mentioned properties one by one. That means, once a property is satisfied, the property can be maintained for the rest of the steps; (3) robustness of the re-meshing approach is valued with a highest priority, so that the re-meshing approach can process any inputs created by different domains of applications. Under guaranteed robustness, a computational efficacy is improved as much as possible.

The re-meshing approach can include two main stages: a mesh extraction and a mesh optimization. During the mesh extraction stage, an unsigned distance field can be computed (or determined) for $M_i$. An iso-surface mesh extraction approach can be introduced for a positive offset distance (or an iso-value) d. All invisible disconnected components can further be removed from the extracted iso-surface to obtain a mesh $M_d$. The generated $M_d$ can recover sharp features implied by the d-iso surface of the distance field (e.g., $d=l/n_p$), and have the guarantees of being watertight, manifold, and self-intersection free. The purpose of the mesh extraction stage is to generate a "clean" proxy mesh $M_d$ of the input $M_i$ that possibly has "dirty" topology and geometry configurations. In the mesh optimization stage, a while-loop of three sequential steps: simplification, flow, and alignment can be implemented. The simplification step aims to reduce a number of triangles of $M_d$ by performing one pass of quadric edge-collapse decimation for the entire mesh. The flow step aims to pull $M_d$ close to $M_i$ via a per-vertex distance minimization. The alignment step aims to optimize the surface normal of $M_d$ so that the sharp features are maintained, which can be achieved through local surface patch optimization. When the while loop stops, a final mesh $M_o$ can be outputted. Since all three steps contain only local operations, the guarantees of $M_d$ that are achieved during the first stage can be easily maintained by skipping any operations that violate a guarantee.

Figure 2:
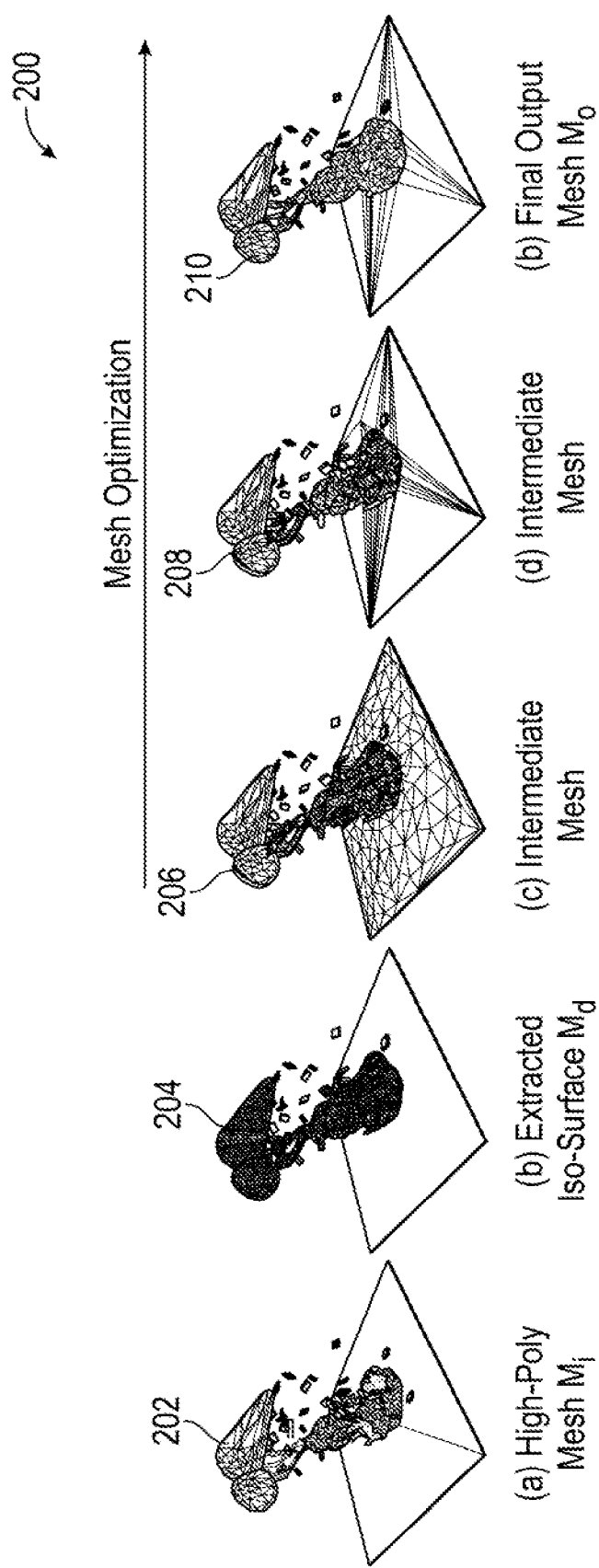
FIG. 2 is an illustration of an exemplary pipeline of an algorithm to generate a low-poly mesh.

FIG. 2 shows an exemplary pipeline (200) of the re-meshing approach of the disclosure. As shown in FIG. 2, an input high-poly surface $M_i$ (202) can be provided as an input mesh. The input mesh (or input surface) $M_i$ (202) may not be manifold, orientable, or self-intersection free. In an example, the input surface $M_i$ (202) is not 2-manifold, with 114 non 2-manifold edges, has 751 components, and is not orientable (the back faces are rendered in black). The input surface $M_i$ (202) can have over 36 k faces, among the 23345 faces are self-intersected. Based on the mesh extraction, an extracted iso-surface $M_d$ (204) can be obtained. The $M_d$ (204) can be obtained based on an iso-value 1/200×a diagonal length of a bounding box of $M_i$ (202). The $M_d$ (204) can be an orientable, water-tight, self-intersection free mesh and include 19-component surface with 760 k faces. Surfaces (206), (208), and (210) show the mesh optimization step during which the mesh simplification, the flow, and the alignment are performed respectively, without breaking any existing topological and geometrical properties of $M_d$ (204). As shown in FIG. 2, compared with the input mesh $M_i$ (202), the final mesh $M_o$ (210) is a low-poly (e.g., 2703 faces), orientable and water-tight surface with only 19 connected components. The example shown in FIG. 2 resolves the existing topological issues (e.g., nonmanifoldness) and geometrical issues (e.g., self-intersection), and represents a similar shape of the input mesh $M_i$ (202) with only 7.3% faces of the input mesh $M_i$ (202).

Given $M_i$ and d, a goal of the mesh extraction is to extract a d-iso surface mesh $M_d$ that is topologically watertight and manifold, and geometrically feature-preserving and self-intersection-free. It is a solved problem to guarantee $M_d$ with any of these properties. However, it is a challenging task to ensure all the properties for $M_d$ simultaneously. In the disclosure, the mesh extraction can include following steps: (1) computing a proper voxel-discretization of an unsigned distance function defined for $M_i$; (2) extracting iso-surface with recovered feature vertices for each voxel; (3) edge-flipping of the extracted mesh to recover feature lines; and (4) post-processing to suppress noise in feature computation. For the extracted mesh, interior components can further be removed.

In the first step of the mesh extraction, implicit function discretization can be performed to generate a plurality of voxels in a bounding box of an input mesh $M_i$, and one or more iso-surfaces can be further determined in each of the voxels.

An exemplary process of voxel generation in an input mesh $M_i$ can be illustrated in Algorithm 1.

---

Algorithm 1 Generate Cube Grids

---

Input: $M_i$, d
Output: Cube grid G
1: bbox ← boundingBox($M_i$)
2: L ← bbox.diagLength     ▷ diagonal length
3: $L_d$ ← max(0.1, d)[L, L, L]
4: M ← bbox.upperRight + $2L_d$
5: m ← bbox.bottomLeft − $2L_d$     ▷ slightly larger bbox
6: δ ← d||M − m||/√3     ▷ cube size
7: $N_i$ ← [($M_i$ − $m_i$)/d], i = x, y, z
8: G ← generateCubeGrids($N_x$, $N_y$, $N_z$, M, m)     ▷ generate cube grids

---

As shown in step 1 of Algorithm 1, a bounding box of an input mesh $M_i$ can be determined. At step 2, a diagonal length L of the bounding box can be determined. At step 3, a length parameter $L_d$ can be determined as a product of (i) a greater value between the iso-value d and a constant value (e.g., 0.1) and (ii) the diagonal length L. At step 4, an upper right coordinate M can be determined by shifting an upper right coordinate of the bounding box, for example by twice the length parameter $L_d$. A bottom left coordinate m can be determined by shifting a bottom left coordinate of the bounding box, for example by twice the length parameter $L_d$. At step 6, a size of each voxel can be determined. For example, the size of each voxel can be determined as a value over a square root of 3, where the value can be equal to a product of the iso-value d and a magnitude of the upper right coordinate M minus the bottom left coordinate m. At step 7, a first voxel number $N_x$ indicating a number of the plurality of voxels in a first direction (e.g., x), a second voxel number $N_y$ indicating a number of the plurality of voxels in a second direction (e.g., y), and a third voxel number $N_z$ indicating a number of the plurality of voxels in a third direction (e.g., z) can be determined. At step 8, a plurality of voxels in the bounding box of the input mesh can be determined based on the first voxel number, the second voxel number, the third voxel number, the upper right coordinate, and the bottom left coordinate.

Since $M_i$ is topologically complex with an ill-defined interior (or with an interior that includes detailed features), a signed distance function may not be computed for $M_i$. Therefore, an unsigned distance function can be applied to avoid any ambiguity. The unsigned distance function can be defined as follows in equation (1):

$$f(p) := \min_{q \in M_i} \|p - q\| \qquad \text{Eq. (1)}$$

the p can be a point in an ambient space of $M_i$, and the q can be a surface point in the $M_i$.

Figure 3:
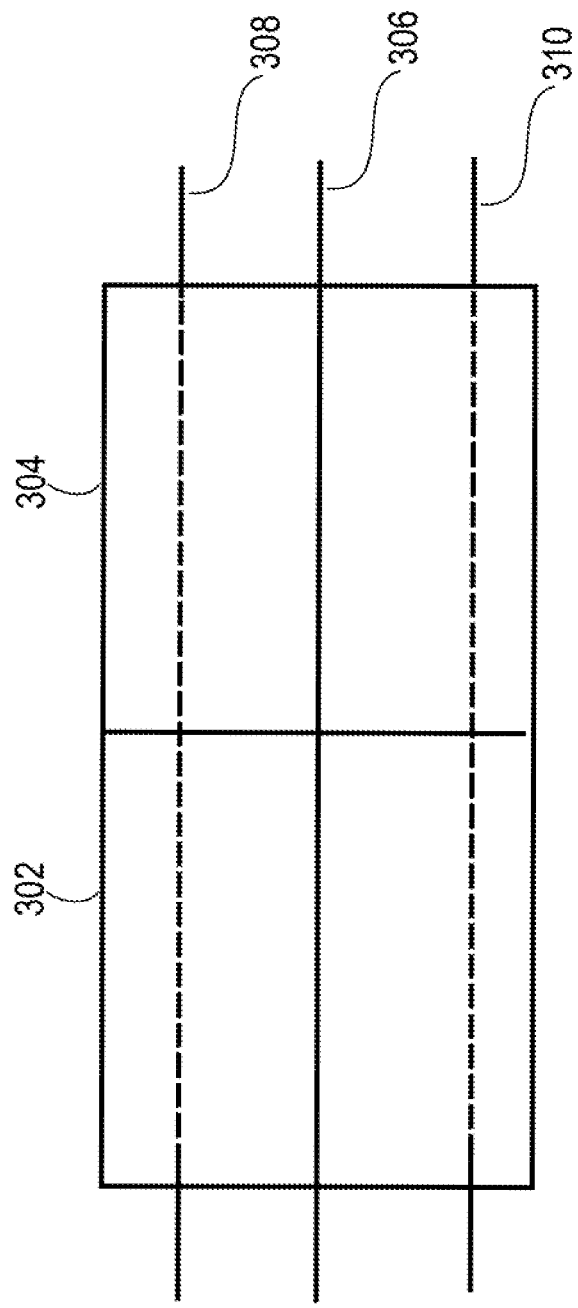
FIG. 3 is a schematic illustration of an exemplary iso-surface in a voxel.

Therefore, a d-iso surface can be determined by solving f(p)=d. Since an exact solution of such p is intractable, an ambient space around $M_i$ can be uniformly voxelized and a solution can be approximated through a piecewise linear interpolation. A size of the voxel can play a crucial role of the to-be-extracted mesh. A too large voxel can miss important solutions, while excessively small voxels can result in a dense grid that is time-consuming to compute. An exemplary illustration of extracted meshes based on different voxel sizes can be illustrated in FIG. 13. In addition, an edge length of a voxel can be determined based on d/√3 to avoid some missing geometry. An exemplary size of a voxel can be shown in FIG. 3. As shown in FIG. 3, a plurality of voxels (e.g., (320) and (340)) can be determined according to Algorithm 1, for example. An input surface (306) can extend through the voxels. One or more theoretical d-iso surfaces (e.g., (308) and (310)) can be identified to extend through the voxels. The theoretical d-iso surfaces (308) and (310) can be parallel to the input surface (306) and have a same distance to the input surface (306). The theoretical d-iso surfaces may not be captured by an actual iso-surface extraction.

In the second step of the mesh extraction, feature vertices (or feature points) can be determined based on the iso-surfaces that are determined in the first step. For each voxel, root-finding approximation templates can be applied to decide connected iso-contours. An exemplary illustration of the templates of the iso-contours (or iso-surfaces) in a voxel is provided in FIG. 19. An additional feature vertex (or feature point) can subsequently be computed (or determined) for each iso-contour, and finally the iso-contour can be triangulated. An extracted mesh can be obtained based on either marching cubes (MCs) method or MC33 to ensure the extracted mesh is watertight and manifold. In an embodiment, MC33 can be applied as a base template in the disclosure to determine the extracted mesh since MC33 can cover more linear interpolation cases, solve the ambiguity in MC, and lead to a smaller number of genus in the finally extracted mesh.

Figure 4:
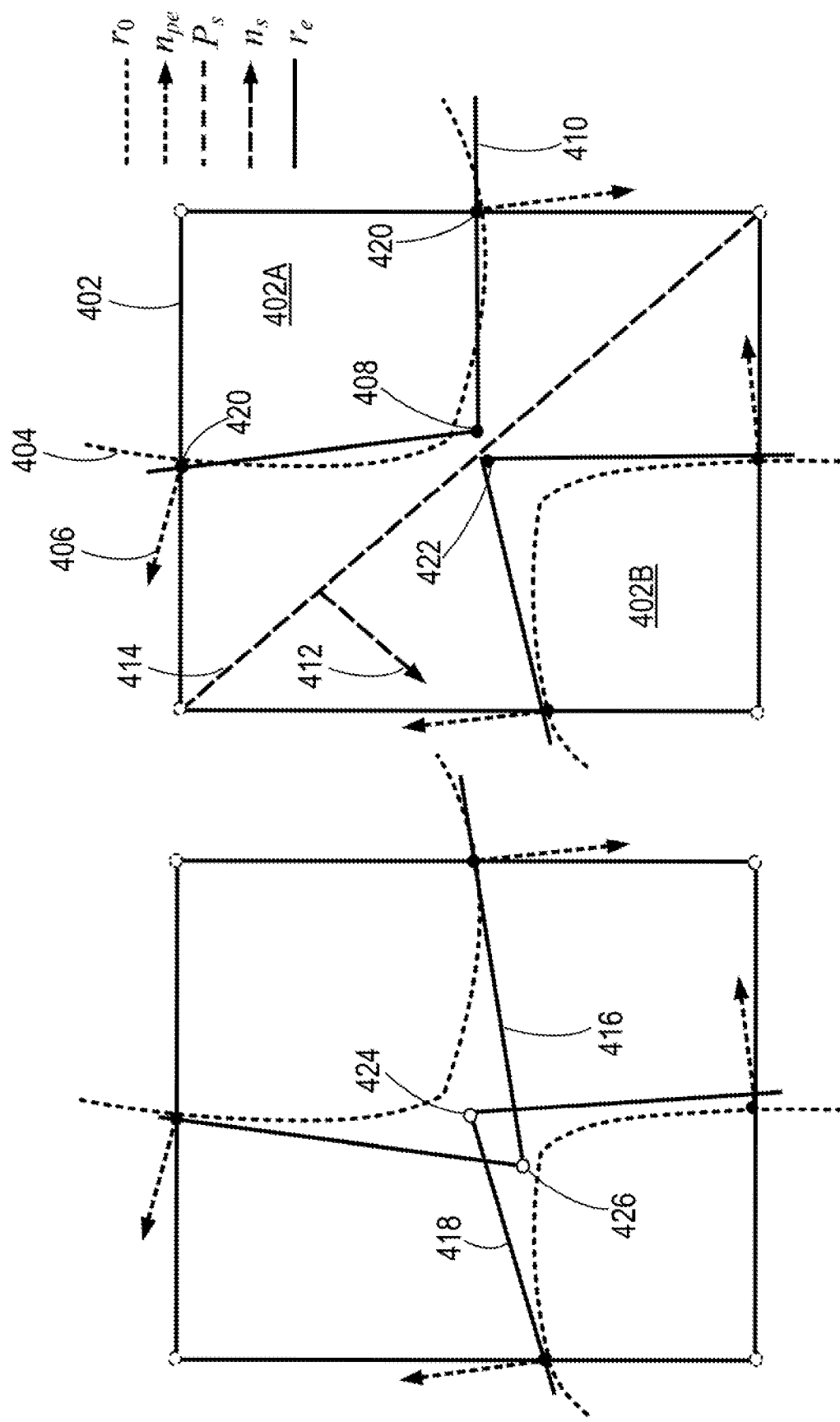
FIG. 4 is a schematic illustration of an exemplary iso-surface extraction.

As illustrated in FIG. 4, for an iso-contour surface (404), a vertex (or feature point) can be inserted into each MC33 component to provide more degrees of freedom to capture possible feature points. FIG. 4 is a 2D illustration of an iso-surface extraction step within a square (e.g., (402)). The square (e.g., (402)) can represent a top-down view of a voxel. The curve (404) $r_0$ can represent a theoretical iso-surface. A straight line (410) re can represent an extracted iso-surface. np$_e$ (406) can be an input normal information at an intersection points p$_e$ (420) between r$_0$ and the square. P$_s$ (414) can be a separation plane used to prevent self-intersection within the square (402). The separation plane (414) can divide the voxel into two components. n$_s$ (412) can be a normal of the separating plane (414). Feature points (408) and (422) can be determined in each component of the voxel (or square). Thus, the theoretical iso-surface (404) can be represented by the extracted iso-surface (406) that is formed based on the intersection points p$_e$ (420) and the feature point (408).

FIG. 4 shows that intersection of tangent planes (e.g., (410)) of the roots (e.g., (420)) computed on the voxel edges can lead to an additional point (e.g., (408)) close to sharp features. However, the additional vertex may be arbitrarily positioned and cause self-intersections in the extracted iso-surface. For example, as shown in FIG. 4, an extracted iso-surface (416) based on a feature vertex (426) and an extracted iso-surface (418) based on a feature vertex (424) can intersect. To address the issue of intersections, a feature vertex can be constrained within a sub-space of a voxel to guarantee the extracted mesh to be free of self-intersection. A sub-space of a voxel can be constructed for each feature point by simply inserting a set of cutting planes to the voxel. While FIG. 4 shows the sub-space construction strategy in 2D, 3D cases corresponding to the MC33 templates can be provided in FIG. 19 and FIG. 20. According to each of the MC33 templates shown in FIG. 19, a cutting plane can be generated respectively. For cases with only a single contour, cutting planes may simply be six faces of a voxel, which can be shown in case 0 of FIG. 19. For cases with more than one contour, a voxel can be separated into several polyhedra, where each polyhedron can be a sub-space. FIG. 4 gives an illustration in 2D. In the example of FIG. 4, two components (402A) and (402B) lie on two sides of the voxel (402). The voxel thus can be separated into a "bottom-left" side (402B) and an "upper-right" side (402A) and constrain the corresponding feature point (e.g., (408) and (422)) within the corresponding domain.

Accordingly, a coordinate x of a feature point can be obtained by solving a linear constrained quadratic programming (or function) as shown in equation (2):

$$\arg\min_x \Sigma_e (Nf(p_e) \cdot (x - p_e))^2 \quad \text{Eq. (2)}$$

s.t.

$$n_i \cdot x \geq 0 \wedge lx \leq x \leq ux,$$

where p$_e$ is the root found for each voxel edge, n$_{p_e}$ is any normalized component of the Clarke subdifferential at p$_e$, n$_s$ is the normal of a partitioning plane to constrain x to stay within the polyhedron, and lx, ux are the coordinate lower bound and upper bound for x respectively to ensure x is inside the cube. To compute n$_{p_e}$ for some p$_e \in M_i$, a mesh normal can be used. While for p$_e \notin M_i$, any p$_e^* \in \arg\min_{p \in M_i} \|p_e - p\|$ can be solved at first, and then let N$_f(p_e) := (p_e - p_e^*)/\|p_e - p_e^*\|$. After the iso-surface with feature vertices is computed for each voxel, a watertight and manifold mesh can be extracted by approximating $f(p) = d$.

Figure 7:
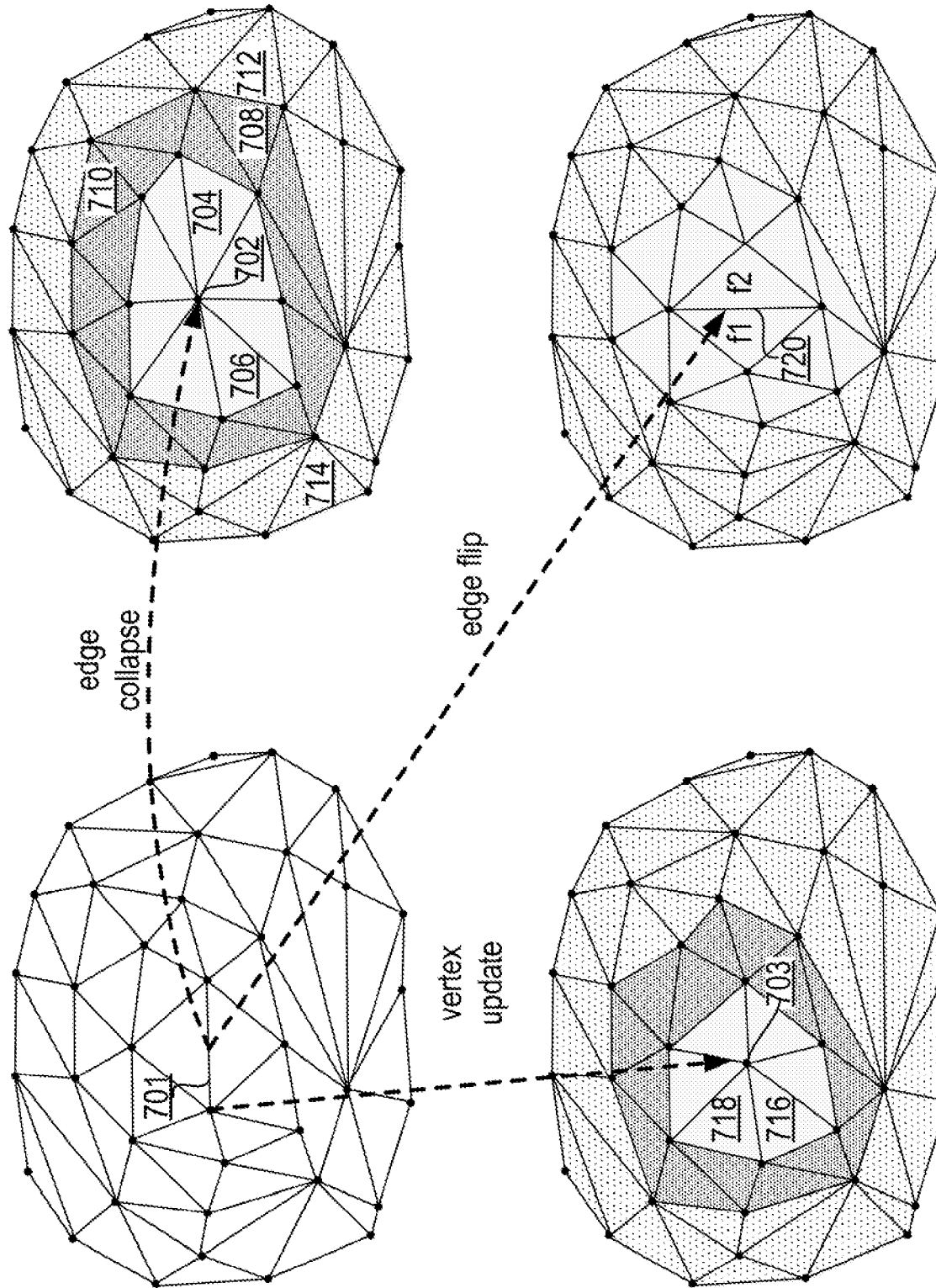
FIG. 7 is an illustration of an exemplary edge operation and an exemplary vertex operation.

In the third step of the mesh extraction, feature edges can be recovered. As mentioned in the second step of the mesh extraction, points on feature lines can be recovered. In the third step, edge flip operations can be applied to each extracted mesh edge to recover the feature edges if the flipped edge can connect two feature points. In an example, the edge flip operation can flip an edge to an opposite orientation of the edge. For example, as shown in FIG. 7, an edge (701) is rotated to an edge (720) based on an edge flip operation. A detailed process of the feature edge recovery can be shown in FIG. 5 and algorithm 2, for example. To ensure the self-intersection-free guarantee, edge-flips that may cause self-intersections can be skipped.

| Algorithm 2 Feature Recovery Edge Flip |
|---|
| Input: M$_t$, |
| Output: M$_d$ |
| 1:  M$_d$ ← M$_t$ |
| 2:  Q←{ } |
| 3:  for each edge e ∈ M$_t$ do |
| 4:    if e.oppVs are feature points then |
| 5:      Q.push(e)    ▷ opposite vertices are feature points |
| 6:    end if |
| 7:  end for |
| 8:  while Q ≠ { } do |
| 9:    e ← Q.top( ) |
| 10:   if e in on boundary then |
| 11:     continue |
| 12:   end if |
| 13:   if e was not flipped before then |
| 14:     if selfIntersectionCheck(M$_d$, e) then |
| 15:       doFlip(M$_d$, e)   Flip doesn't introduce intersection |
| 16:     end if |
| 17:   end if |
| 18:  end while |

As shown in step 1 of algorithm 2, a feature mesh M$_t$ can be assigned to M$_d$. The M$_t$ can be generated in the step 2 of the mesh extraction by connecting the determined feature points. As shown in step 4 of the algorithm 2, when two end points of an edge of the feature mesh M$_t$ are determined as feature points, the edge can be included in a group Q. At step 14, in response to the edge not being flipped previously, performing an intersection check to determine whether the edge intersects with one or more neighboring edges. In response to the edge not intersecting with the one or more neighboring edges, the edge flip operation can be performed on the edge. After the edge flip operation, the iso-surface mesh M$_d$ can be generated.

Figure 5:
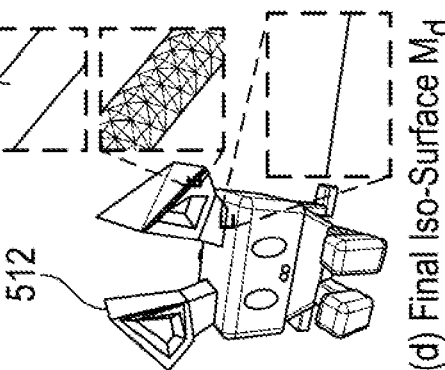
FIG. 5 is an illustration of an exemplary pipeline of an iso-surface extraction.
Figure 5:
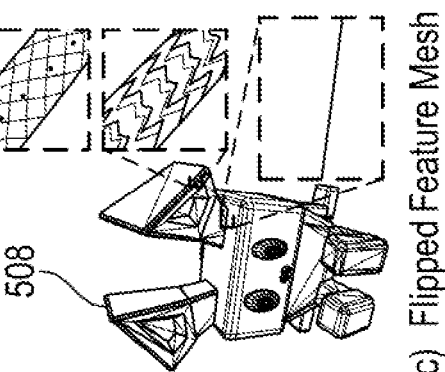
Figure 5:
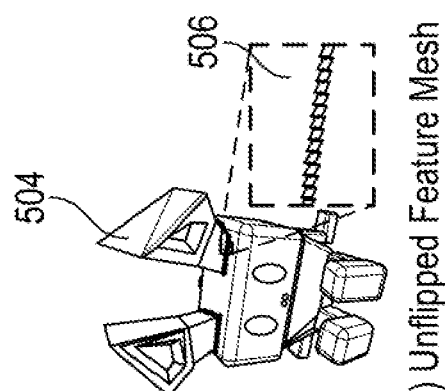
Figure 5:
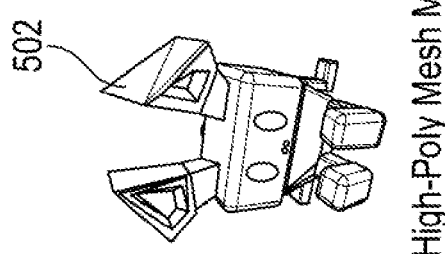

In the fourth step of the mesh extraction, feature denoising can be performed. As mentioned in the third step of the mesh extraction, the iso-surface mesh M$_d$ can be obtained after the feature edge recovery based on the edge flip operation. The iso-surface mesh M$_d$ can satisfy the desired topologic and geometric properties. However, some regions of the extracted mesh M$_d$ can include visually non-appealing sawtoothed artifacts, which can be a typical problem in related examples as well. Examples of the artifacts (e.g., (506) and (510)) can be shown in FIG. 5 for example. In order to remove the artifacts, a post feature identification process can be applied. In the post feature identification process, a feature graph can be built, where an edge is defined as a feature edge only if a dihedral angle of the edge is smaller than a specific angle threshold θ$_0$. The feature graph can provide a feature network that includes nodes and curves connecting the nodes. A feature curve can be marked as valid only if the feature curve includes more than l$_0$ mesh edges (or feature meshes). Further, only feature points on the feature curves denoted as valid can be kept, and the rest of the feature points can be removed from the iso-surface mesh M$_d$. As shown in FIG. 5, the feature points before and after the denoising process can be shown in zoom-in regions (510) and (514), respectively, where noisy features on an ear of the iso-surface mesh $M_d$ can be removed successfully, and major sharp features can still be kept.

In the mesh extraction, an interior removal process can be performed. As mentioned above, when an unsigned distance function (e.g., equation (1)) is applied, a final MC33 result (e.g., iso-surface mesh $M_d$) may have interior components, which can be totally invisible. Given the generated mesh $M_d$ are watertight and free of self-intersection, an in-and-out test can be applied to determine the interior components, and the interior components can further be removed.

FIG. 5 shows an exemplary pipeline of the mesh extraction. As shown in FIG. 5, an input mesh $M_i$ (502) can be provided. An unflipped feature mesh $M_t$ (504) can be extracted based on the first step and the second step of the mesh extraction as mentioned above. As shown in FIG. 5, a zoom-in region (506) of an ear of the feature mesh $M_t$ shows artifacts (e.g., a sawtooth-shaped artifact). Feature edges of the unflipped EMC33 feature mesh $M_t$ can be recovered based on the third step of the mesh extraction to generate the flipped feature mesh (or iso-surface mesh) $M_d$ (508). As shown in a zoom-in region (510) of $M_d$ (508), noisy features on the ear of the $M_d$ (508) still remain. After the feature denoising, the noisy features can be removed in the final iso-surface mesh $M_d$ (512), where noisy features on a zoom-in region (514) of the $M_d$ (512) is removed. As shown in FIG. 5, the mesh extraction process can successfully resolve the artifact in a sawtooth shape at the ear of the character to render a smooth shader, and still keep major sharp features of the input mesh $M_i$ (502).

A detailed process of the mesh extraction can be shown in Algorithm 3, for example.

```
Algorithm 3 Iso-surface Extraction

Input: M_i, d, θ_0, l_0
Output: M_d
1:  G ← generateCubeGrids(M_i, d)                    ▷ Algorithm 1
2:  Compute f(p) for all grid points p in G          ▷ Equation 1
3:  for each cube ∈ G do                             ▷ EMC33
4:      decode cube case                             ▷ FIG. 19
5:      for each component in cube case do
6:          Compute the iso-points on cube edges
7:          Form the linear constrained quadratic program   ▷ Equation 2, FIG. 20
8:          Solve for the feature point to get M_t   ▷ FIG. 19
9:      end for
10: end for
11: M_d ← edgeFlip(M_t) to connect feature points    ▷ Algorithm 2
12: M_d ← featureDenoise(M_d, θ, l_0)                ▷ Feature denoising
13: M_d ← removeInterior(M_d)                        ▷ Internal removal
```

Figure 19:
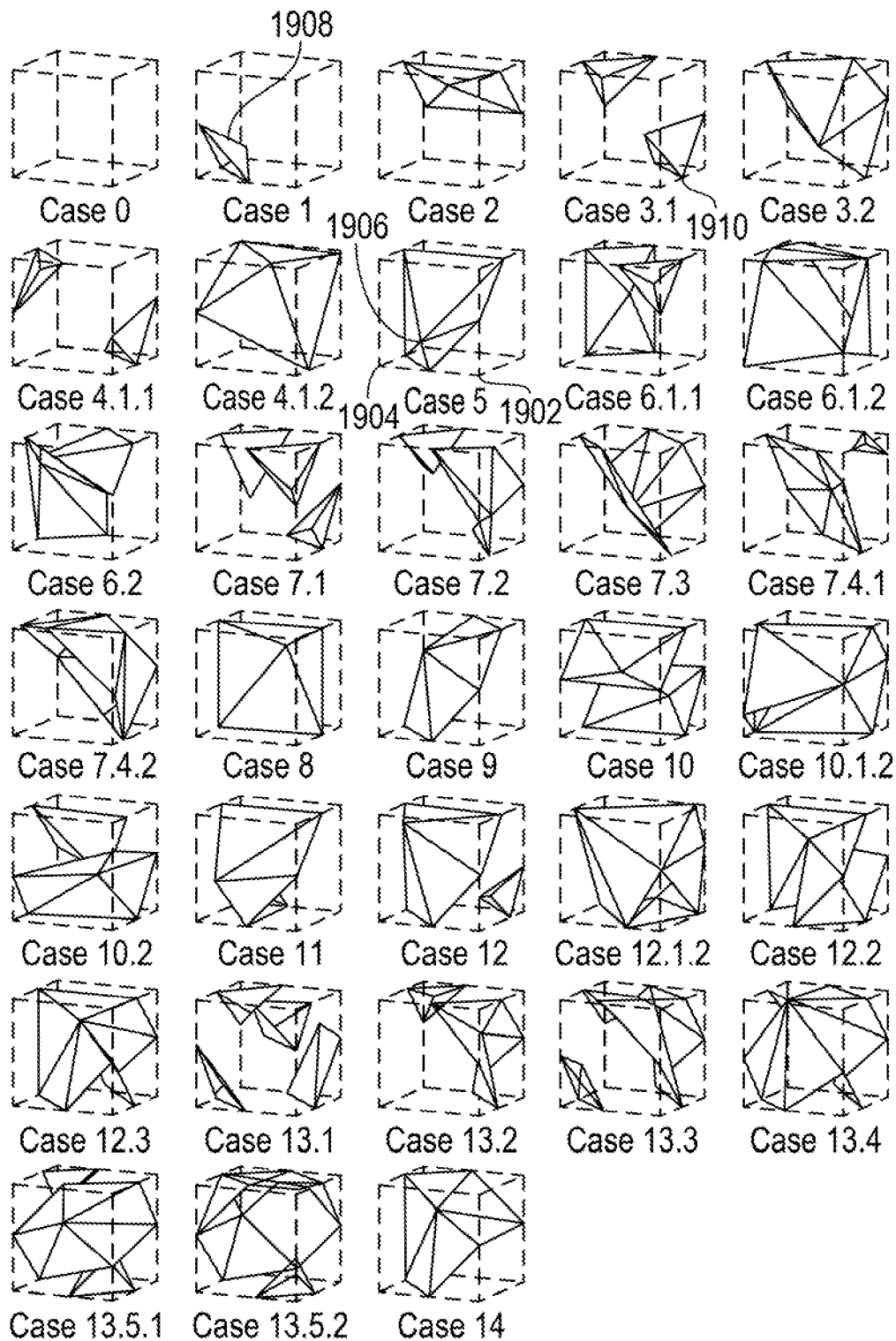
FIG. 19 is an exemplary illustration of an EMC 33 look up table.

As shown in step 1 of Algorithm 3, a plurality of voxels can be generated in a bounding box of an input mesh $M_i$. Details of the generation of the voxels can be provided in Algorithm 1, for example. At step 2, an unsigned distance field can be determined based on equation (1). Iso-surfaces can further be determined based on the unsigned distance field. At step 4, for each cube (or voxel), an EMC 33 template can be determined and the voxel can be divided into a plurality of components based on the EMC33 template. An exemplary EMC 33 template is shown in FIG. 19. At step 6, iso-points (e.g., (420)) on cube edges can be determined in each component of the voxel. At step 7, a linear constrained quadratic program can be formed based on the iso-points, according to equation 2. At step 8, a feature point for each component of the voxel can be solved based on the linear constrained quadratic program. Exemplary feature points of the voxel can be shown in FIG. 19. The feature points can be triangulated to generate the iso-surface mesh $M_d$. At step 11, an edge flip operation can be performed to recover the feature edge of the $M_d$. At step 12, the feature denoising can be performed to remove noisy features. At step 13, the internal components of the $M_d$ can be removed further.

Mesh optimization can start from a mesh $M_o = M_d$ (e.g., assign $M_d$ to $M_o$ as an input mesh for the mesh optimization). The mesh can be watertight, manifold, feature preserving, and self-intersection-free. An iterative mesh optimization approach can be introduced to obtain a final $M_o$ that satisfies the desired properties, which may include (1) The number of triangles of $M_o$ is either as small as possible or equal to $n_F$ if $n_F$ is provided as a parameter; (2) $M_o$ is indistinguishable from $M_i$ when rendered at a view distance so that the number of pixels taken along the diagonal of the bounding box of $M_i$ is smaller than $n_p$; (3) $M_o$ is both topologically and geometrically clean, e.g., watertight, manifold, and intersection-free; and (4) $M_o$ preserves sharp features of $M_i$ as much as possible. The mesh optimization involves a maximum N iterations of three sequential steps: simplification, flow, and alignment. Details of the mesh optimization can be shown in Algorithm 7. The iteration may not stop until either a Hausdorff distance between simplified meshes of two consecutive loops is smaller than $\in_1$ or the loop number (or iteration number) is N, or the target face number $n_F$ is satisfied, where the first condition has a highest priority by default. Each of the three steps can involve only local operations. To ensure the optimization proceeds towards the generation of $M_o$ with the desired properties, checks as follows can be performed for the meshes before and after applying a local operation, denoted as $M_b$ and $M_a$ respectively:

(1) Topology consistency: $M_a$ is manifold and watertight and has the same genus and the number of components as $M_b$; and (2) Self-intersection-free: $M_a$ is free of triangle intersections, overlappings, and touchings.

The simplification step aims to achieve the first property of $M_o$, i.e., $M_o$ contains as few triangles as possible. In an example of the simplification step, an edge-collapse operation can be applied for all edges of $M_o$ to reduce the faces as many as possible, where the coordinates of the newly generated vertices are determined by the quadratic edge metric (QEM) weighted by virtual planes for each edge to avoid the degeneracy in planar regions. Importantly, the topology and geometry validity of $M_o$ is maintained during the simplification process by skipping those edge-collapse operations that may violate the aforementioned checks. Moreover, to ensure $M_o$ to be closer to $M_i$ (e.g., the iso-surface mesh $M_d$), the collapse operations which increase a vertex-surface distance between affected local triangle patches of $M_o$ and $M_i$ can also be skipped. To ensure similar visual appearance, the collapse operations leading to a large Hausdorff distance update can be skipped, where the Hausdorff can be computed approximately by sampling 10 points on local triangle patches of $M_o$.

Algorithm 4 shows an exemplary simplification process.

---

Algorithm 4 Mesh simplification

Input: $M_i$, $M_o$, d
Output: simplified $M_s$
Notes: $M_i$ is the reference mesh
1:  Form priority queue Q
     $M_s \leftarrow M_o$
2:  while Q ≠ { } do
3:     e ← Q.top( )
4:     if e has been visited before then
5:        continue              ▹ has been collapsed
6:     end if
7:     if validation Check($M_d$, e) failed then
8:        continue
9:     end if
10:    if selfIntersectionCheck($M_d$, e) failed then
11:       continue        ▹ collapse will introduce intersection
12:    end if
13:    $M_{sub}$ ← sub-mesh adjacent to e
14:    $M'_{sub}$ ← Me after collapse
15:    if dist($M_{sub}$, $M'_{sub}$) > d then
16:       continue            ▹ distance update is too large
17:    end if
18:    if dist($M_{sub}$, $M_i$) ← dist($M'_{sub}$, $M_i$) then
19:       continue            ▹ collapse increases the distance to
20:    end if
21:    doCollapse($M_s$, e)      ▹ satisfy all desired properties
22:  end while
23:  return $M_s$

---

As shown in algorithm 4, at step 3, an edge e of $M_o$ can be taken out from a group of edges Q. In response to the edge not being collapsed based on a determination at step 4, a validation check can be performed at step 7. The validation check at step 7 can verify whether the topology consistency is met after an edge-collapse operation is performed on the edge to form a simplified mesh $M_s$. In some embodiments, an edge-collapse operation can collapse an edge by removing it, merging its adjacent vertices to one, and reconnecting the adjacent edges to a merged vertex. In an example of FIG. 7, an edge (701) is removed by an edge-collapse operation and a vertex (702) is newly created based on the edge-collapse operation.

In response to the topology consistency being met, a self-intersection check can be performed at step 10 to verify whether the $M_s$ is free of self-intersection when an edge-collapse operation is performed on the edge. In response to the $M_s$ being free of self-intersection, at step 15, whether a first distance between a sub-mesh of the input mesh $M_{sub}$ and a sub-mesh $M_{smb}'$ of the simplified mesh $M_s$ is larger than an iso-value d is determined. The sub-mesh of the input mesh $M_{sub}$ can include faces adjacent to the edge e (e.g., (701)) before the edge-collapse operation. The sub-mesh $M_{sub}'$ of the simplified mesh $M_s$ can include faces associated with the edge after the edge-collapse operation. For example, as shown in FIG. 7, the faces (e.g., (704) and (706)) of $M_{sub}'$ can be in contact with a vertex (e.g., (702)) that is determined (or newly formed) when the edge-collapse operation is applied on the edge (e.g., (701)).

In response to the first distance dist ($M_{sub}$, $M_{sub}'$) being less than the iso-value, at step 18, a determination can be made to determine whether a second distance dist ($M_{sub}$, $M_i$) between the sub-mesh of the input mesh and a reference mesh $M_i$ is less than a third distance dist ($M_{sub}'$, $M_i$) between the sub-mesh of the simplified mesh and the reference mesh. In some embodiments, the reference mesh $M_i$ can be an input mesh provided in the mesh extraction. In response to the second distance being larger than the third distance, the edge-collapse operation can be performed on a second edge of the input mesh $M_o$. When each edge of the mesh $M_o$ has been verified with the edge-collapse operation, the simplified mesh $M_s$ can be provided at step 23.

The flow step can aim to bring $M_o$ geometrically close to $M_i$ to reduce silhouette visual differences between the two meshes. Since the flow process is purely geometrical, a mesh connectivity may not be modified by the flow process. Thus, only the self-intersection-free check is required afterwards. In some embodiments, an iteration flow process can be introduced in the mesh optimization. An exemplary iterative flow process can be provided in Algorithm 7.

When the mesh flow process is actually applied, for each vertex υ in $M_o$, an Euclidean-distance-wise closest point $\tilde{v}$ of the vertex υ can be identified in $M_i$. The vertex υ can further be pushed to P along a vector $d_v = \tilde{v} - v$. In some embodiments, instead of using the entire vector as a gradient, υ can be deformed towards $\tilde{v}$ based on a fractional ratio r of the vector, which allows a more moving space for the entire mesh and reduces the chance of optimization stuck when $M_o$ is still far from $M_i$. In some embodiments, a simple line search can be applied for the self-intersection-free check to find a maximum step size during the local deformation. An exemplary of the mesh flow process can be shown in Algorithm 5.

---

Algorithm 5 Local Update

Input: M, υ, $d_v$
Output: updated υ
1:  α ← 1
2:  while υ + $ad_v$ lead to self-intersection do
3:     α ← α/2

| Algorithm 5 Local Update |
| --- |
| 4:    end while |
| 5:    return v + 0.95ad$_v$    ▸ avoid numerical error |

As shown in Algorithm 5, at step 1, a constant value, such as 1, can be assigned to a fractional ratio α. Further, a closest vertex $\tilde{v}$ of a vertex $v$ of the simplified mesh $M_s$ can be determined in the input mesh (e.g., $M_i$). A vector $d_v$ between the closet vertex $\tilde{v}$ of the vertex $v$ and the vertex $v$ can be determined. At step 2, a position of the vertex $v$ can be updated as $v+\alpha d_v$. Further, whether a face of the simplified mesh that includes the vertex intersects one or more neighboring faces in the simplified mesh can be determined. At step 3, in response to the face of the simplified mesh that includes the vertex intersecting the one or more neighboring faces, the fractional ratio α can be reduced, such as by 50%. At step 5, in response to the face of the simplified mesh that includes the vertex passes the self-intersection check, the position of the vertex $v$ can be updated as $v+0.95\alpha d_v$, for example.

The mesh flow process can stretch the mesh unanimously (or equally in each dimension of the mesh), which can in turn break features and create dirty inputs for subsequent mesh simplification and flow procedure. An example of the impact of mesh flow process can be shown in FIG. 6. Thus, a feature alignment step can be applied after the mesh flow process. In the feature alignment step, for each vertex $v$ of the simplified mesh $M_s$ after the mesh flow process, an optimized position $v^*$ can be determined by minimizing a shape difference between a local surface of $v^*$ and a local surface of $v$ before the mesh flow. The feature alignment step may be performed on a subset of the vertices of the simplified mesh M in some examples. For example, the optimized position $v^*$ of the vertex $v$ can be determined based on an unconstrained quadratic programming (or function) as shown in equation (3).

$$E(v) := \Sigma_{f \in N(v)} \left\| \frac{n(f)}{\|n(f)\|} - \frac{\tilde{n}(f)}{\|\tilde{n}(f)\|} \right\|^2 \quad \text{Eq. (3)}$$

As shown in equation (3), a normal disagreement of $n(f)$ and $\tilde{n}(f)$ can be applied to approximate the shape difference. $n(f)$ can be an unnormalized face normal of the current mesh (e.g., the simplified mesh $M_s$ after the mesh flow process). $\tilde{n}(f)$ can be an unnormalized face normal of the mesh before mesh flow step (e.g., the simplified mesh $M_s$). As shown in Algorithm 6, the $n(f)$ and $\tilde{n}(f)$ can be computed by a cross product of any two of face edges. The summation takes over all faces within 1-ring neighborhood of vertex $v$. The faces within 1-ring neighborhood of vertex $v$ can be faces that are in direct contact with the vertex $v$. Notice that equation (3) is a nonlinear function, which can be solved by a classical Newton Method. In order to improve the efficiency, $\|n(f)\|$ can be treated as constant, which can be equal to a value at the beginning of feature alignment step, denoted as $c_n$. The equation (3) can thus be solved based on a quadratic approximation shown in equation (4).

$$E(v) := \Sigma_{f \in N(v)} \left\| \frac{n(f)}{\|c_n\|} - \frac{\tilde{n}(f)}{\|\tilde{n}(f)\|} \right\|^2 \quad \text{Eq. (4)}$$

By solving the unconstrained quadratic programming (or function) shown in equation (4), a corresponding $v^*$ that minimizes the equation (4) can be determined. The vertex $v$ can further be updated to $v^*$ with the self-intersection check based on the Algorithm 5, where $$d_v = v^* - v.$$

Figure 6:
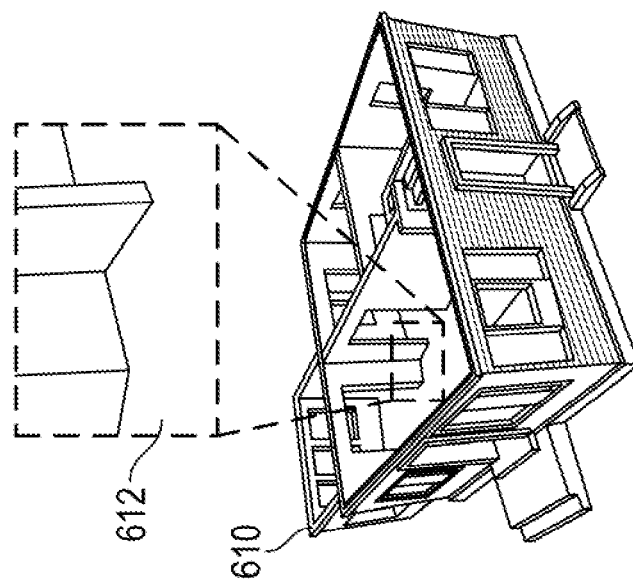
FIG. 6 is an illustration of an exemplary feature alignment process.
Figure 6:
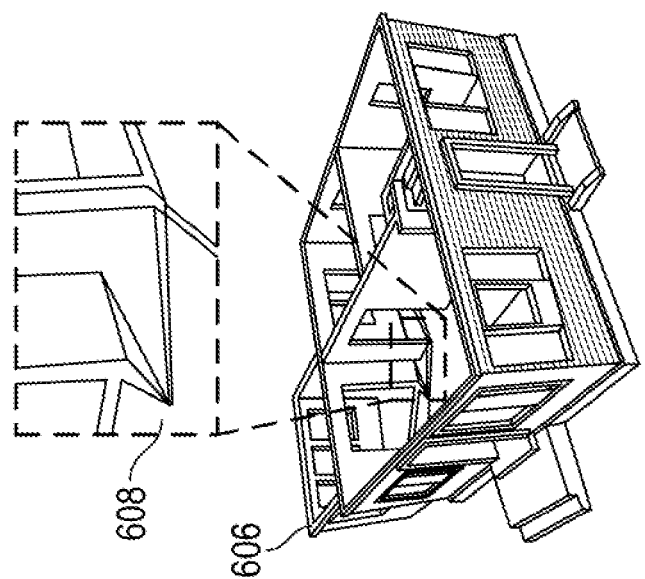
Figure 6:
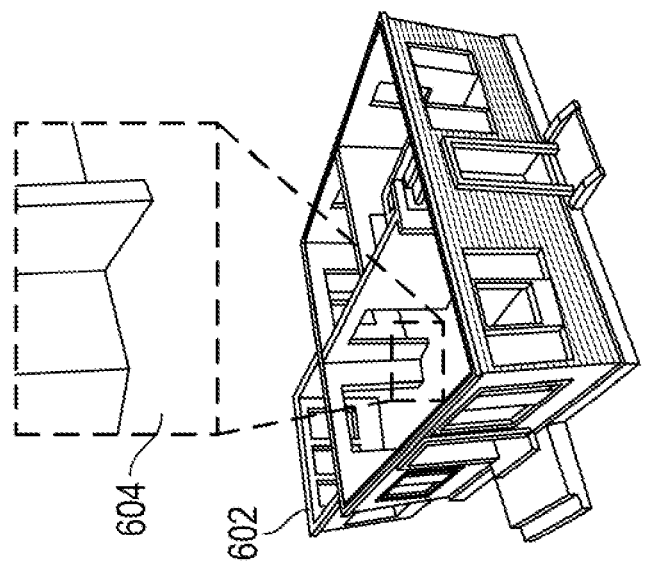

FIG. 6 shows an exemplary impact of the feature alignment process. As shown in FIG. 6, an input high-poly mesh (602) can be provided. A zoom-in region (604) of the high-poly mesh (602) shows a door entrance. After the simplification and flow process, a mesh (606) can be generated. As shown in a zoom-in region (608) of the mesh (606), broken features can be illustrated in the door entrance. After a feature alignment, a low-poly mesh (610) can be generated. A zoom-in region (612) of the low-poly mesh (610) shows clean features in the door entrance.

An exemplary feature alignment process can be shown in Algorithm 6.

| Algorithm 6 Feature Alignment |
| --- |
| Input: $M_s$, $M_o$, $v$ |
| Output: updated $v$ which preserves features |
| Require: $M_s$ and $M_o$ has the same mesh connectivity |
| 1:    for each $f \in N(v)$ do    ▸ loop over adjacent faces |
| 2:        $\eta_f \leftarrow e_0 \times e_1$    ▸ unnormalized face normal of $M_o$ (after simplification and flow) |
| 3:        $c_\eta \leftarrow \|\eta_f\|$    ▸ get the initial normal |
| 4:        $\tilde{\eta}_f \leftarrow \tilde{e}_0 \times \tilde{e}_1$    ▸ unnormalized face normal of $M_s$ (after simplification) |
| 5:    end for |
| 6:    Fix $c_\eta$, get $v^*$ by minimizing Equation (4)    ▸ quadratic program |
| 7:    return $v^*$ |

As shown in algorithm 6, at step 2, a unnormalized face normal $n_f$ of a face $f$ in a face union $N(v)$ can be determined. The face union $N(v)$ can include faces in direct contact with a vertex $v$ of the input mesh after the simplification and flow process. The $n_f$ can be determined as a cross product of two face edges $e_0$ and $e_i$ of the face $f$. At step 3, a normal constant $c_n$ can be determined as a magnitude of the unnormalized face normal $n_f$. At step 4, an unnormalized face normal $\tilde{n}_f$ of a corresponding face to the face $f$ in the simplified mesh $M_s$ can be determined. At step 6, an optimized position $v^*$ of the vertex $v$ can be determined by minimizing the equation (4).

The mesh optimization process can be shown in algorithm 7

---

Algorithm 7 Mesh Optimization Process

---

Input: $M_i$, $M_d$, d, N
Output: $M_o$
1:  $M_o \leftarrow M_d$
2:  L $\leftarrow$ bboxSize($M_i$)         ▷ diagonal length of bounding box
3:  for i = 0 to N do
4:      M' $\leftarrow M_o$
5:      $M_s \leftarrow$ meshSimplification ($M_i$, $M_o$, d)    ▷ Algorithm 4
6:      $M_o \leftarrow M_s$
7:      for each vertex $v \in M_o$ do        ▷ flow back step
8:          $\tilde{v} \leftarrow \arg\min_{\mu \in M_i} \|\mu - v\|$
9:          $d_v \leftarrow (\tilde{v} - v)/8$        ▷ successive flowing
10:         $v \leftarrow$ localUpdate($M_o$, $v$, $d_v$)     ▷ Algorithm 5
11:     end for
12:     for each vertex $v \in M_o$ do    ▷ feature alignment step
13:         $v^* \leftarrow$ featureAlignment($M_s$, $M_o$, $v$)    ▷ Algorithm 6
14:         $d_v \leftarrow v^* - v$
15:         $v \leftarrow$ localUpdate($M_o$,$v$,$d_v$)        ▷ Algorithm 5
16:     end for
17:     if Hausdorff ($M_o$, M') < min($10^{-5}$L, 0.1dL) then
18:         Break            ▷ update is smaller enough
19:     end if
20: end for

---

As shown in step 1 of algorithm 7, the iso-surface $M_d$ can be assigned to $M_o$ as an input mesh. At step 2, a diagonal length L of a bounding box of a reference mesh $M_i$ can be determined. In an example, the reference mesh $M_i$ can be the high-poly mesh from which the iso-surface $M_d$ is derived based on the mesh extraction. At step 4, $M_o$ can be assigned to an intermediate mesh M'. At step 5, a mesh simplification process can be performed, for example based on algorithm 4, to generate a simplified mesh $M_s$. At step 6, the simplified mesh $M_s$ can be assigned to $M_o$. At step 8, a closest vertex $\tilde{v}$ of a vertex $v$ of mesh $M_o$ can be determined. The closest vertex $\tilde{v}$ can be a vertex u that is located in the reference mesh $M_i$ and has a closest distance to the vertex $v$. At step 9, a first vector $d_v$ can be determined. At step 10, a flow process can be performed based on algorithm 5 on the $M_o$. At step 13, a feature alignment process can be performed on the $M_o$, for example based on the algorithm 6. Based on the feature alignment process, an optimized position $v^*$ of the vertex $v$ can be determined. At step 14, a second vector $d_v$ can be determined based on a difference of the optimized position $v^*$ of the vertex $v$ and the position of the vertex $v$. At step 15, another feature flow process can be performed based on the second vector $d_v$, for example based on algorithm 5. As shown in algorithm 7, the mesh optimization process can be performed based on an iterative process. The iterative process can be terminated when an iteration number i is larger than a target value N, or a Hausdorff distance between the mesh $M_o$ and the intermediate mesh M' is less than a threshold value. The threshold value can be a smaller number between $10^{-5}$L and 0.1dL. It should be noted that, when the iterative process is completed, the mesh $M_o$ is the final low-poly output mesh.

In the disclosure, a speed up of the self-intersection check can be provided. Starting from an intersection-free 3D triangle mesh, the low-poly re-meshing pipeline of the disclosure can introduce intersections. For example, an intersection can be introduced when the edge flips are performed in the mesh extraction, the edge collapses are performed during the simplification step of mesh optimization, and the vertex optimization (e.g., the flow and the alignment steps) of the mesh optimization. Intersection of a mesh can include an overlap of any two triangles of the mesh, or a touch or a penetration of any two non-adjacent triangles of the mesh.

For a vertex $v$, $N^i(v)$ can be denoted as a set of all triangles that are bounded within a i-th ring neighborhood of the vertex $v$. For example, as shown in FIG. 7, $N^1(v)$ of a vertex (702) can include triangles (704) and (706). $N^2(v)$ of the vertex (702) can include triangles (708) and (710). $N^3(v)$ of the vertex (702) can include triangles (712) and (714).

For an edge e and a triangle $f$, $N^i(v)$ and $N^i(f)$ can be defined to be $\cup_{v \in e} N^i(v)$ and $\cup_{v \in f} N^i(v)$, respectively. $M_e$ can be defined as a sub-mesh that includes all updated faces after an edge operation (e.g., edge flip or edge collapse). For example, as shown in FIG. 7, $M_e = \{f_1, f_2\}$ for edge flip, where $f_1$ and $f_2$ are the two neighboring triangles of e (720). $M_e = N^1 v'$ for edge collapse, where v' is the newly created vertex (702) and $M_e$ includes faces (e.g., (704) and (706)) in contact with the v'. $M_e = N^1 v'$ for vertex optimization (or vertex update), where $M_e$ can include triangles (or faces) (e.g., (716) and (718)) in contact with a newly created vertex (703). Moreover, $M_f$ can be denoted as a sub-mesh formed by all faces that share at least one vertex with $M_e$. For example, the $M_f$ can include faces (708) and (710) when the edge collapse is applied. $M_1 = M_f \cup M_e$. A remaining portion of the mesh can be denoted as $M_r$. For example, $M_r$ can include faces (712) and (714) when the edge collapse is applied.

Whether an operation introduces self-intersection is equivalent to meeting the following two conditions: (1) $M_e$ does not intersect with $M_r$, (2) $M_i$ is free of self-intersection. In general, the two conditions can be handled by a triangle-triangle intersection check. However, the triangle-triangle intersection check is inefficient to check whether $M_e$ intersects with $M_r$, especially when $M_r$ contains lots of triangles. Given $M_e$ does not share any vertex or edge with $M_r$, whether $M_e$ intersects with $M_r$ can be checked by a bounding volume hierarchy (BVH)-based collision detection. The BVH mesh intersection check can be illustrated in algorithm 8.

Algorithm 8 BVH Meshes Intersection Check

```
    Input: M_e, M_r.
    Output: whether M_e intersects with M_r.
    Notes: all faces M_e doesn't share vertices with the faces in M_r.
1:  BVHTree T
2:  T.build(M_r)
3:  for each face f∈M_e do
4:      f_1 ← T.closetFace(f)           ▷ get the closest face
5:      if triTriIntersection(f, f_1) then
6:          return true                  ▷ does intersect
7:      end if
8:  end for
9:  return false                         ▷ does not intersect
```

As shown in algorithm 8, at step 1, a BVH Tree type variable can be initiated. At step 2, a BVH tree data structure of the mesh $M_r$ can be constructed based on the BVH Tree type variable. At step 4, a closest face of face $f$ can be assigned to $f_1$, where the face $f$ belongs to $M_e$, and the closest face of face $f$ belongs to $M_r$. At step 5, a triangle-triangle intersection check can be performed to check if the face $f$ and the closet face of $f_1$ intersect.

To check whether $M_1$ is free of self-intersection, because all the faces in $M_e$ share at least one vertex with the faces in $M_f$, the BVH-based acceleration is no longer valid. Thus, $|M_1| \cdot (|M_1|-1)/2$ pairs of triangle-triangle intersection check can be applied. Although $|M_1|=|M_e|+|M_s|$ is usually small for one operation, the edge flip, edge collapse, and vertex optimization operations are executed numerous times during the entire re-meshing pipeline. Avoiding any unnecessary triangle-triangle intersection checks, which is expensive to compute, can lead to a dramatic speedup. Notice that, by construction, $M_1$ is open and has one boundary loop. To check whether a mesh with boundaries has self-intersection, in a related example, a sufficient condition can be provided as follows: let S be a continuous surface, bounded by C, S is self-intersection free if a vector vec exists, such that:

(1) Surface Normal Test: for every point p of S, $n_p \cdot vec > 0$, where $n_p$ is the surface normal at p.

(2) Contour Test: a projection of the contour C along the vec is not self-intersected.

In the related example, a discrete version for triangle meshes can be provided as follows:

(1) Surface Normal Test: the angle of the normal cone formed by all triangle face normals is less than $\pi/2$.

(2) Contour Test: a projection of the mesh boundary C along the normal cone axis is not self-intersected.

For the surface normal test, a tight normal cone merging algorithm can be applied. For the contour test, a side-sign based unprojected contour test can be applied.

In the disclosure, the surface normal test alone was determined to be sufficient to guarantee no self-intersection, given meshes are always water-tight. The surface normal test may only need $|M_1|$ times normal cone expansion. A triangle-triangle intersection check can be applied if the surface normal test fails. As shown in Table 2 and Table 3, only applying the Surface Normal Test can result in a ~100 time speedup of a full normal cone test, and 10 time speedup for a parallel triangle-triangle pair check. Moreover, the normal cone test acceleration can speed up the whole flip process by 1.6 times and collapse process by 2.6 times.

An exemplary speedup summary of edge-flip operations for some of figures in the disclosure is shown in Table 2. The upper indices 't', 'b', 'l', 'r' in the Figures column represent the 'top', 'bottom', 'left' and 'right' respectively. $T_{Nei}$ represents the cost by the neighboring triangle intersection check only with surface normal test. $T'_{Nei}$ and $T^*_{Nei}$ are the same time information with full normal cone test (surface normal+contour test) and parallel triangle pairs intersection check. The speedup ratio $r_s$ are also reported.

TABLE 2

A speedup summary of an edge-flip operation

Figure 9:
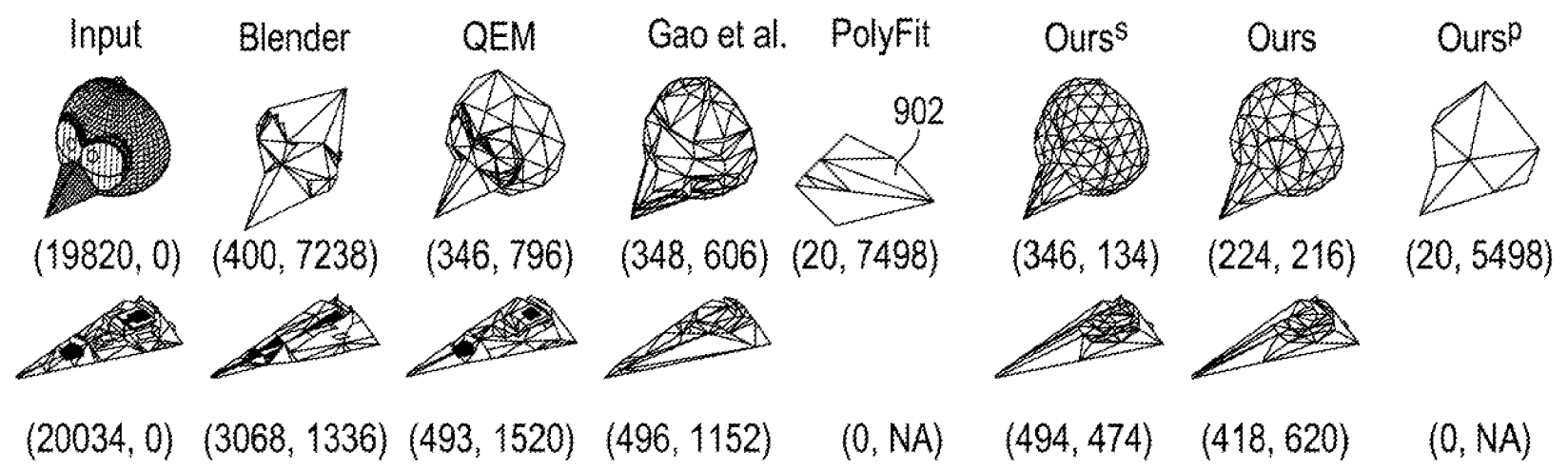
Figure 10:
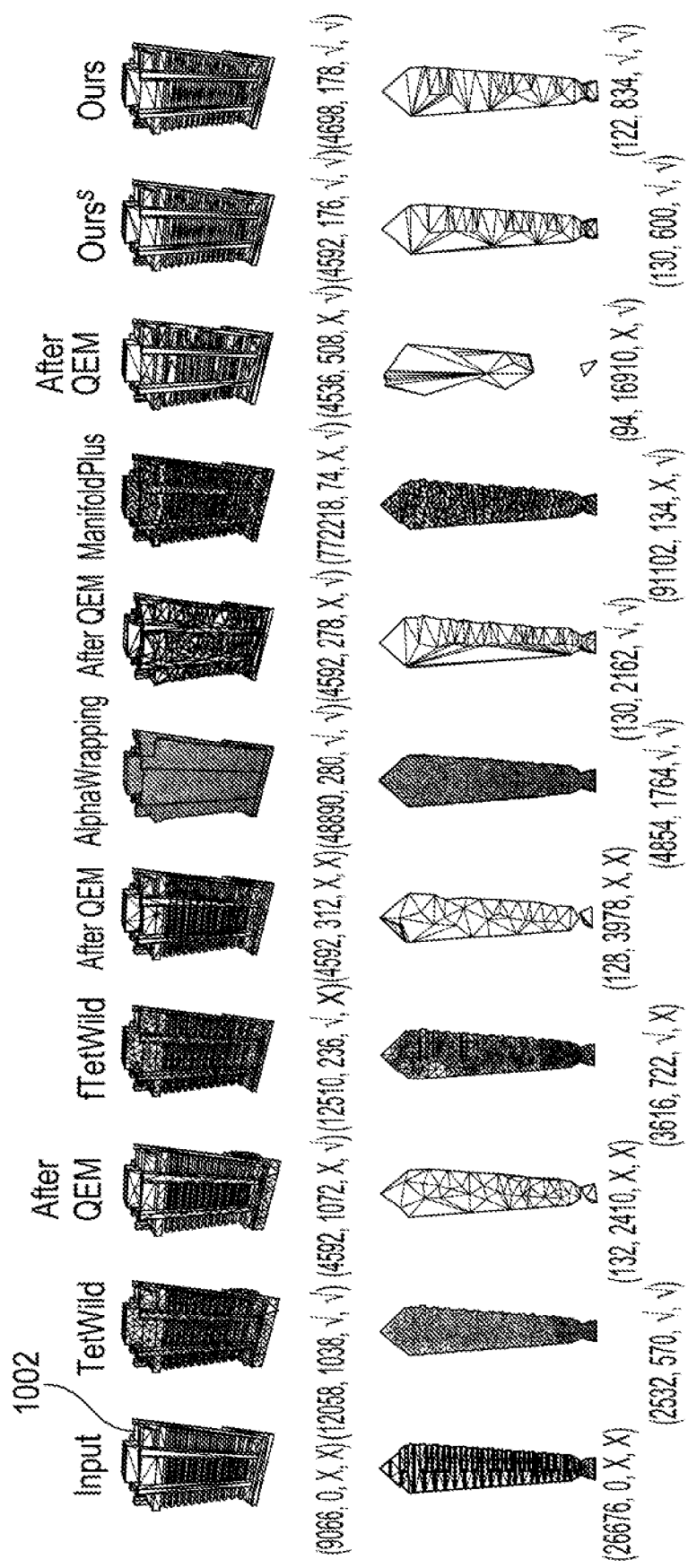
FIG. 10 shows exemplary comparisons of different methods for generating a low-poly mesh in accordance with some embodiments.
Figure 12:
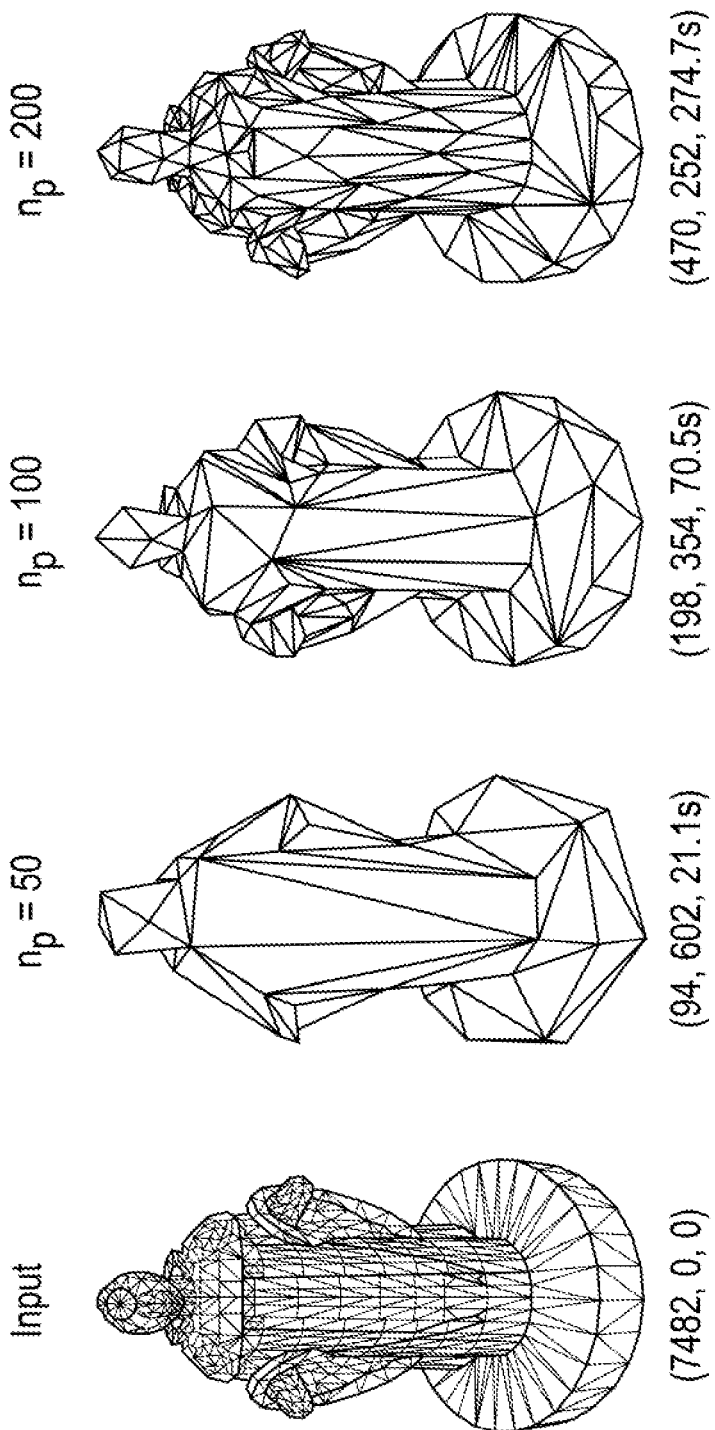
FIG. 12 shows exemplary comparisons of different re-meshed results based on different user-specified distance tolerances in accordance with some embodiments.
Figure 18:
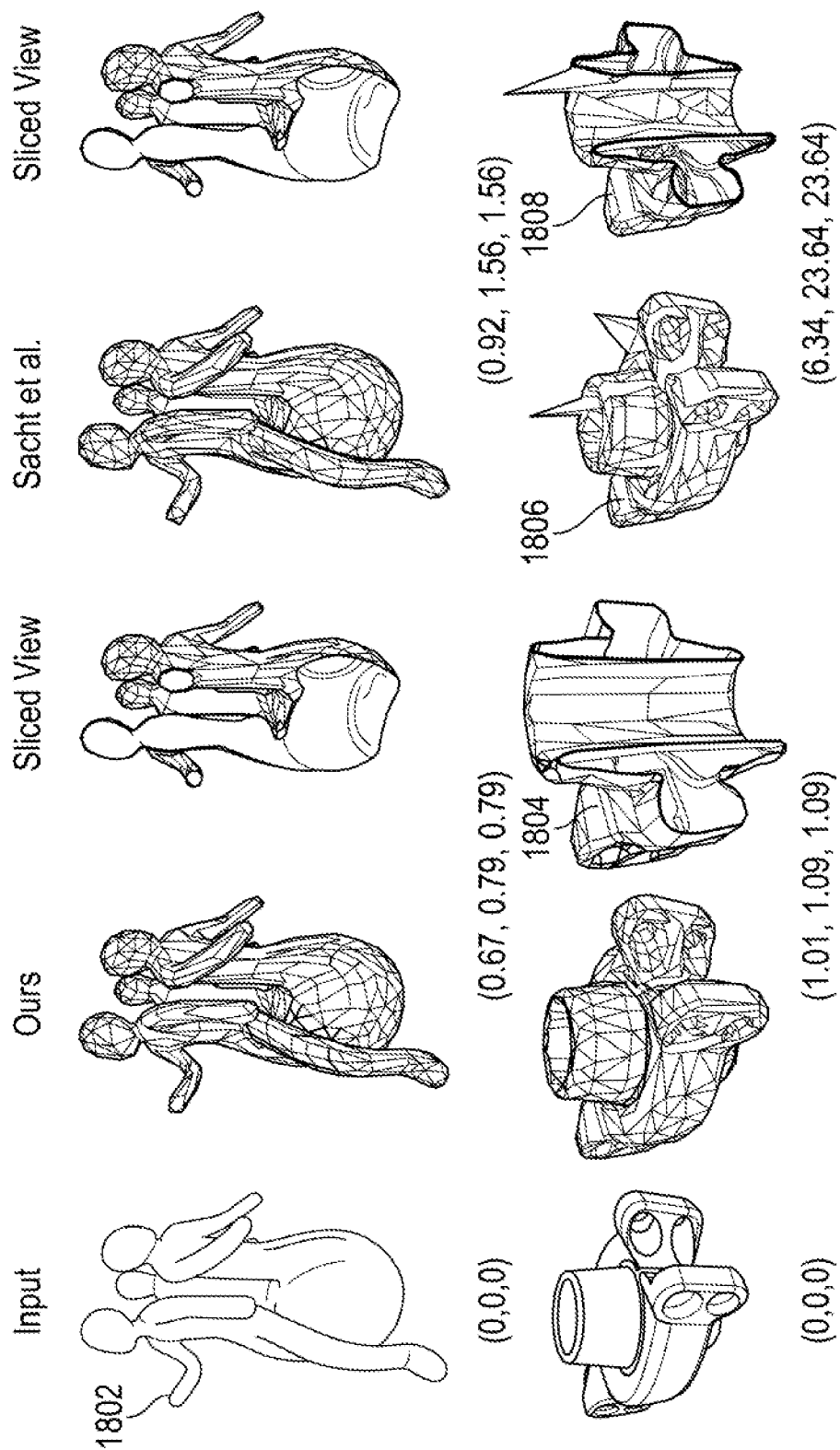
FIG. 18 shows exemplary comparisons of different methods for generating a low-poly mesh in accordance with some embodiments.

| FIGS. | $T_{Nei}(s)$ | $T'_{Nei}(s)$ | $r_s$ | $T^*_{Nei}(s)$ | $r_s$ | $T_{tot}(s)$ | $T'_{tot}(s)$ | $r_s$ | $T^*_{tot}(s)$ | $r_s$ |
|---|---|---|---|---|---|---|---|---|---|---|
| FIG. 2 | 5.47 | 730.05 | 133.56x | 20.84 | 3.81x | 36.34 | 767.10 | 21.11x | 58.84 | 1.62x |
| FIG. 5 | 3.55 | 522.80 | 155.92x | 14.16 | 3.99x | 43.01 | 593.93 | 13.81x | 55.80 | 1.30x |
| FIG. 8$^t$ | 3.31 | 520.09 | 157.01x | 24.14 | 7.29x | 31.74 | 551.23 | 17.37x | 53.98 | 1.70x |
| FIG. 8$^b$ | 2.86 | 430.18 | 150.41x | 15.54 | 5.43x | 31.53 | 460.09 | 14.59x | 46.55 | 1.48x |
| FIG. 9$^t$ | 4.15 | 676.55 | 163.04x | 12.83 | 3.09x | 40.51 | 714.86 | 17.65x | 51.16 | 1.26x |
| FIG. 9$^b$ | 2.80 | 333.25 | 119.01x | 7.73 | 2.76x | 18.44 | 349.56 | 18.95x | 24.43 | 1.32x |
| FIG. 10$^t$ | 6.09 | 966.82 | 158.66x | 62.21 | 10.21x | 80.99 | 1044.94 | 12.90x | 142.84 | 1.76x |
| FIG. 10$^b$ | 1.30 | 181.81 | 139.61x | 8.46 | 6.49x | 8.69 | 189.80 | 21.84x | 16.40 | 1.89x |
| FIG. 12$^r$ | 2.83 | 414.79 | 146.78x | 8.54 | 3.02x | 37.72 | 451.52 | 11.97x | 44.86 | 1.19x |
| FIG. 18$^l$ | 3.56 | 512.30 | 143.85x | 12.17 | 3.42x | 37.15 | 546.85 | 14.72x | 46.51 | 1.25x |
| Average | 4.08 | 580.79 | 142.14x | 20.82 | 3.81x | 40.57 | 619.24 | 16.06x | 59.80 | 1.62x |

Table 3 shows a speedup summary of edge-collapse operation for some of figures of the disclosure.

TABLE 3

A speedup summary of an edge-collapse operation

| FIGS. | $T_{Nei}(s)$ | $T'_{Nei}(s)$ | $r_s$ | $T^*_{Nei}(s)$ | $r_s$ | $T_{tot}(s)$ | $T'_{tot}(s)$ | $r_s$ | $T^*_{tot}(s)$ | $r_s$ |
|---|---|---|---|---|---|---|---|---|---|---|
| FIG. 2 | 7.26 | 626.49 | 86.30x | 96.72 | 13.32x | 62.87 | 685.75 | 10.91x | 163.86 | 2.61x |
| FIG. 5 | 6.54 | 641.74 | 98.11x | 113.52 | 17.36x | 65.23 | 704.57 | 10.80x | 183.43 | 2.81x |
| FIG. 8$^t$ | 7.36 | 682.13 | 92.67x | 129.58 | 17.60x | 66.32 | 747.66 | 11.27x | 196.71 | 2.97x |
| FIG. 8$^b$ | 5.18 | 469.52 | 90.56x | 161.75 | 31.20x | 57.79 | 528.23 | 9.14x | 220.86 | 3.82x |
| FIG. 9$^t$ | 4.91 | 505.71 | 103.08x | 53.83 | 10.97x | 47.94 | 552.88 | 11.53x | 96.79 | 2.02x |
| FIG. 9$^b$ | 2.89 | 273.13 | 94.38x | 35.74 | 12.35x | 25.43 | 297.82 | 11.71x | 59.34 | 2.33x |
| FIG. 10$^t$ | 18.50 | 1699.68 | 91.87x | 497.79 | 26.91x | 198.20 | 1902.56 | 9.60x | 728.73 | 3.68x |
| FIG. 10$^b$ | 1.83 | 163.58 | 89.40x | 31.27 | 17.09x | 15.51 | 179.60 | 11.58x | 47.41 | 3.06x |

TABLE 3-continued

A speedup summary of an edge-collapse operation

| FIGS. | $T_{Nei}(s)$ | $T'_{Nei}(s)$ | $r_s$ | $T^*_{Nei}(s)$ | $r_s$ | $T_{tot}(s)$ | $T'_{tot}(s)$ | $r_s$ | $T^*_{tot}(s)$ | $r_s$ |
|---|---|---|---|---|---|---|---|---|---|---|
| FIG. 12$^r$ | 5.16 | 520.71 | 100.86x | 97.56 | 18.90x | 53.74 | 577.34 | 10.74x | 150.33 | 2.80x |
| FIG. 18$^l$ | 5.22 | 490.74 | 93.93x | 81.58 | 15.61x | 49.93 | 543.93 | 10.89x | 130.51 | 2.61x |
| Average | 6.78 | 630.27 | 93.50x | 136.68 | 13.32x | 67.54 | 697.82 | 10.66x | 207.33 | 2.61x |

Algorithms of the disclosure were implemented in C++, using Eigen for linear algebra routines, CGAL for exact triangle-triangle intersection check, libigl for basic geometry processing routines, where an embedded fast winding number was used for interior components identification. A bottom-up BVH traversal algorithm was applied to refit the BVH for self-intersection check, and Metro was used for Hausdorff distance computation. In an example, $\theta_0=120°$, $l_0=4$, $N=50$, and $r=\frac{1}{8}$. Experiments of the disclosure were performed on a workstation with a 32-cores Intel processor clocked at 3.7 Ghz and 256 Gb of memory, and TBB was used for parallelization.

The algorithms of the disclosure were tested based on a dataset that is a subset of Thingi10K, where 100 models were randomly selected and models with a number of triangles smaller than 5000 were filtered out. In the dataset, an average number of faces and an average number of disconnected components are 120K and 10 respectively. An average number of non-manifold edges and an average number of self-intersected triangle pairs are 2197 and 6729 respectively.

The generated low-poly mesh outputs can be evaluated from several aspects: a number of contained triangles, topology (watertightness and manifoldness) and geometry (self-intersection-free) guarantees, and visual preservation of the input.

Regarding visual-preservation metrics, since the disclosure is based on a visual-preserving re-meshing algorithm, any geometry-preserving metric, such as Hausdorff distance, may not fit well for the evaluation, especially when many of the inputs involve inside geometries. The inside geometries may have little contribution to the visual perception. Thus, for visual similarity measurement, following metrics can be employed:

(1) Light field distance (LFD), which measures a visual similarity between two 3D shapes based on model retrieval.
(2) Silhouette and normal difference for visual similarity comparison.
(3) Peak signal-to-noise ratio (PSNR), a well-known metric used as a quality measurement between the original and compressed model in the image space.

The proposed method of the disclosure was compared with commercial software, such as the mesh reduction (e.g., Simplygon[1]) and the re-meshing (e.g., Simplygon[2]) modules of a state-of-the-art commercial solution: Simplygon. Simplygon can automatically generate simplified meshes and is popularly used by game studios. Since both the proposed method and Simplygon$^i$ can flexibly control the number of triangles of an output mesh, the visual preservation metrics and guarantees were compared by matching the number of triangles of outputs of Simplygon[2].

Evaluation results of the proposed methods that have matched triangle numbers to Simplygon can be denoted as Ours$^S$. Evaluation results that are performed without applying a target face number as one of the stopping criteria can be denoted as Ours. The LFD of the comparisons can be listed in Table 5. The difference between the proposed methods and the commercial software can be highlighted in FIG. 8. FIG. 8 shows comparisons between the proposed algorithm and Simplygon. (•, •) denotes (face number, light field distance). Notice that, some input meshes may have inconsistent face orientations, such as the mesh (802) shown in the top row where some triangles of the mesh are rendered in black. As shown in FIG. 8, compared with both algorithms of Simplygon, the proposed method (e.g., Ours or Ours$^S$) can guarantee the outputs to be watertight and free of self-intersections. Moreover, the proposed method can achieve a 63.2% and 10.7% better visual score on average over the tested dataset under the same simplification ratio for Simplygon[1,2] respectively.

The proposed algorithm was also compared with academic approaches. For example, the proposed algorithm was compared with PolyFit. The proposed algorithm was also compared with typically used low-poly mesh generation approaches, such as QEM module in MeshLab and the Blender decimation modifier. For PolyFit, a uniform sampling filter in MeshLab was applied to sample 1M points on an input high-poly mesh, and use the built-in PolyFit API in CGAL with default parameters for final mesh generation. For all of these approaches, a target face number was set to be the same as meshes generated by Simplygon[2]. One thing to note is that PolyFit often generates meshes with a much fewer number of triangles. Accordingly, the proposed algorithm was simplified to match the triangle numbers of the outputs of PolyFit, which can be denoted as Ours$^P$. For QEM, a target triangle number of QEM can be matched and the topology preservation option can be on. The topology preservation option can be off if the simplification cannot reduce the element count to the desired value. As shown in Table 5, Polyfit fails to generate results for 46 out of 100 models due to the failure of planar feature detection. Gao et al.'s approach (e.g., Low-Poly Mesh Generation for Building Models. In ACM SIGGRAPH 2022 Conference Proceedings (Vancouver, BC, Canada) (SIGGRAPH '22). Association for Computing Machinery, New York, NY, USA, Article 3, 9 pages) fails to provide any results for 13 out of 100 models within the computing time limit of 1 h. QEM and Blender generate considerably worse results in terms of topology and geometry guarantees. As shown in Table 4, the approach of the disclosure achieved the best visual similarity scores, 95.0%, 58.6%, 74.5%, and 75.3% LFD smaller than PolyFit, QEM, Blender, and the Gao et al.'s approach, respectively. Comparisons between the proposed algorithm and the academic approaches can also be shown in FIG. 9.

Table 4 shows geometric statistics for different approaches. In the first three columns (e.g., #V, #F, and #Comp), an average number of vertices, faces, and components of the output mesh are provided. All the methods in Table 4 are simplified to meet the output from Simplygon[2], since Simplygon[2] cannot control the simplification ratio. Notice that some approaches generate smaller numbers of faces on average even if a target number is set because a first pass of the approaches (e.g., ftetWild) generated a surface with a face number being smaller than the target number. In the three columns subsequent to the first three columns, a self-intersection free ratio, a manifoldness ratio, and a watertightness ratio are provided respectively. As shown in Table 4, the proposed method of the disclosure is the only re-meshing method, which generates watertight, and a self-intersected free re-meshing surface. Notice that, some re-pairing methods (e.g., AlphaWrapping) also guarantee these properties, but a subsequent decimation process may breach the properties. A success ratio can also be provided in Table 4 when the algorithms in Table 4 are applied to generate a re-meshed surface. A case is treated as a failure case when an algorithm is terminated with an exception, or reaches a timeout threshold (1 h). For TetWild, fTetWild, ManifoldPlus, and AlphaWrapping, all the numbers inside the parentheses are the values before QEM is applied.

FIG. 9 shows comparisons with academia and open-source solutions, where (•, •) denotes (face number, light field distance). The inverted faces are rendered as black. Note that, even after re-orientation using MeshLab, inverted faces still appear in the results of PolyFit. Besides, PolyFit also fails in a second example (902).

The proposed method was compared to alternative pipelines. In an alternative approach, an input surface is firstly repaired to obtain a high-quality surface mesh. A mesh simplification step (e.g., QEM) is subsequently applied to re-mesh the output into a specific face number. The proposed method of the disclosure was compared with four variants of the two-step process, such as TetWild+QEM, fTetWild+QEM, ManifoldPlus+QEM, and AlphaWrapping+QEM. In the comparison, topology and normal preservation options were turned on firstly, and a target face number was set as

TABLE 4

The geometric statistics for different approaches

| Method | #V | #F | #Comp | Intersection-free ratio | Manifold | Watertight | Success Ratio |
|---|---|---|---|---|---|---|---|
| Simplygon[1] | 703 | 1631 | 8 | 9.0% | 37.0% | 34.0% | 100% |
| Simplygon[2] | 763 | 1631 | 2 | 62% | 93.0% | 93.0% | 100% |
| Ours[S] | 760 | 1631 | 2 | 100% | 100% | 100% | 100% |
| Blender | 842 | 1803 | 12 | 11.0% | 19.0% | 14.0% | 100% |
| QEM | 707 | 1629 | 9 | 5.0% | 12.0% | 10.0% | 100% |
| Gao et al. | 458 | 912 | 2 | 60.7% | 91.0% | 91.0% | 89.0% |
| PolyFit | 69 | 55 | 5 | 0% | 88.9% | 0.0% | 54.0% |
| Ours[P] | 214 | 592 | 1 | 100% | 100% | 100% | 100% |
| TetWild + QEM | 753 (3294) | 1611 (6724) | 5 (4) | 63.0% (100%) | 32.0% (20.0%) | 32.0%(20.0%) | 100% |
| fTetWild + QEM | 773 (2323) | 1643 (4747) | 4 (4) | 73.7% (100%) | 38.9% (38.9%) | 38.9%(38.9%) | 95.0% |
| ManifoldPlus + QEM | 747 (338375) | 1610 (676878) | 3 (2) | 24.0% (0%) | 66.0% (100%) | 64.0% (100%) | 100% |
| Alpha Wrapping + QEM | 804 (8869) | 1631 (17762) | 1 (1) | 93% (100%) | 100% (100%) | 100% (100%) | 100% |
| Ours | 541 | 1193 | 2 | 100% | 100% | 100% | 100% |

Table 5 shows visual similarity measurement statistics for different approaches. The visual similarity can be illustrated between an input mesh and an output from different methods. The subscript ave and SD are the abbreviations of average and standard deviation respectively. PSNR is a peak signal-to-noise ratio, LF means a light field distance metric, SD and ND are the silhouette difference and normal difference respectively. Among the four metrics, a larger PSNR indicates a better performance, while the other three are the opposite. As shown in Table 5, the proposed method of the disclosure achieves a better visual similarity on average.

a target face number from Simplygon[2]. If the MeshLab fails to simplify the mesh under these conditions, the topology and normal options were turned off and the mesh simplification step (e.g., QEM) was performed again. As demonstrated in FIG. 10, a main drawback of the two-step process in the alternative pipelines is that mesh-repairing approaches can fix the mesh to different grades, the subsequent simplification step (e.g., QEM) can break desired properties, especially when a desired element count is small. As shown in Table 4, although MainfoldPlus and AlphaWrapping

TABLE 5

Visual similarity measurement statistics for different approaches

| Method | $PSNR_{ave}$ | $PSNR_{sd}$ | $LF_{ave}$ | $LF_{sd}$ | $SD_{ave}$ | $SD_{sd}$ | $ND_{ave}$ | $ND_{ave}$ |
|---|---|---|---|---|---|---|---|---|
| Simplygon[1] | 24.79 | 2.73 | 844.94 | 1806.07 | 10.013 | 0.016 | 0.049 | 0.030 |
| Simplygon[2] | 25.05 | 2.41 | 347.50 | 188.68 | 0.0048 | 0.0043 | 0.040 | 0.064 |
| Ours[S] | 25.21 | 2.49 | 310.30 | 169.58 | 0.0045 | 0.0045 | 0.037 | 0.067 |
| Blender | 23.68 | 3.51 | 1220.74 | 1637.12 | 0.030 | 0.058 | 0.071 | 0.092 |
| QEM | 25.18 | 2.87 | 748.98 | 1059.45 | 0.012 | 0.021 | 0.041 | 0.049 |
| Gao et al. [2022] | 22.55 | 2.63 | 1254.85 | 3978.50 | 0.020 | 0.055 | 0.063 | 0.059 |
| PolyFit | 17.31 | 1.41 | 6173.04 | 25941.63 | 0.29 | 0.15 | 0.51 | 0.16 |
| Ours[P] | 18.67 | 2.19 | 3696.22 | 2700.15 | 0.14 | 0.14 | 0.24 | 0.17 |
| TetWild + QEM | 24.26 | 2.85 | 1932.26 | 7011.41 | 0.029 | 0.094 | 0.062 | 0.11 |
| fTetWild + QEM | 24.21 | 2.77 | 2195.83 | 9562.01 | 0.037 | 0.13 | 0.069 | 0.14 |
| ManifoldPlus + QEM | 25.14 | 2.49 | 559.84 | 1674.21 | 0.0060 | 0.0070 | 0.042 | 0.070 |
| Alpha Wrapping + QEM | 23.18 | 2.28 | 667.40 | 369.27 | 0.018 | 0.0085 | 0.059 | 0.06 |
| Ours | 24.40 | 2.48 | 367.14 | 190.88 | 0.0065 | 0.0058 | 0.042 | 0.066 | generate a manifold and watertight mesh respectively, the subsequent simplification step (e.g., QEM) breaks the manifold and watertight mesh.

FIG. 10 shows a comparison between the proposed method and alternative approaches, where the mesh was repaired at first, then a classical mesh simplification algorithm (e.g., QEM) was run to get low-poly re-meshed results. As shown in FIG. 10, although some algorithms work for the first stage, the second simplification stage can break desired geometry properties. For example, Tetwild and ManifoldPlus work in the first stage, but geometry properties were broken in the second simplification stage after QEM is applied. Still referring to FIG. 10, (•, •, •, •) indicates (face number, light field distance, self-intersection free flag, manifoldness flag). Notice that, AlphaWrapping always generates a self-intersection-free, and water-tight surface, but it does not capture sharp features in the input mesh (1002), which leads to a large light field distance after simplification. fTetWild and MainfoldPlus suffer from inverted face orientation after QEM (e.g., back faces are rendered as black).

Figure 11:
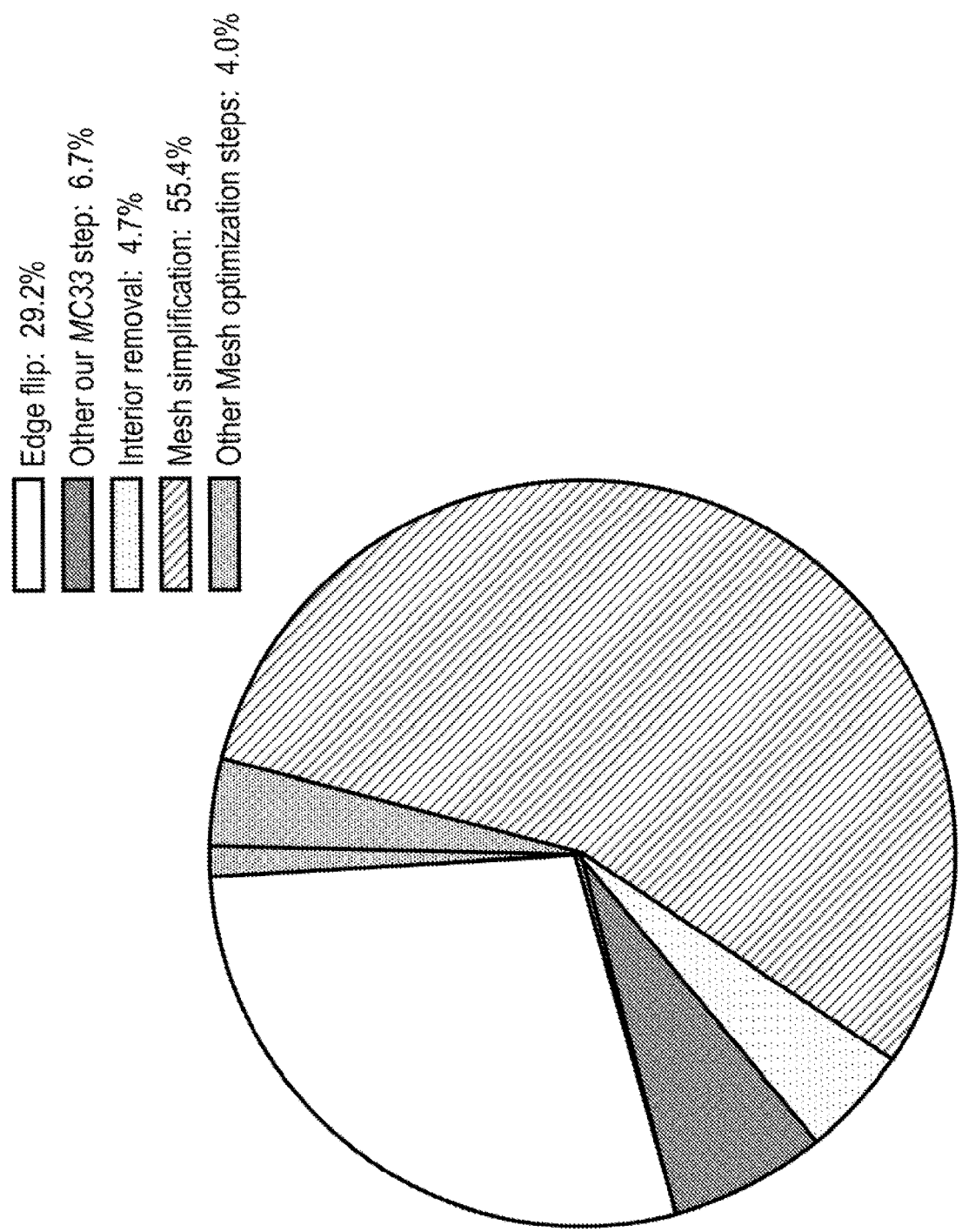
FIG. 11 shows exemplary time statistics for generating a low-poly mesh in accordance with some embodiments.

Table 6 shows time statistics of the proposed method of the disclosure and the comparisons. As shown in Table 6, the proposed method of the disclosure takes about 7 minutes on average to finish while others take less than 2 minutes, except for the approach of Gao et al. (over 10 minutes). The most time-consuming part is the edge-flip (in iso-surface extraction) and edge-collapse (in mesh optimization), where self-intersection checks are involved. FIG. 11 shows that the edge-flip and edge-collapse can take more than 80% of the entire process in the proposed method, where massive self-intersection checks are applied to ensure the desired intersection-free properties.

Table 6 shows time statistics of different exemplary methods. For QEM and blender, final re-meshed results can be generated within one minute. Numbers inside the parentheses are time costs by the corresponding mesh repair algorithm, such as TetWild.

TABLE 6

Time statistics of various methods to generate low-poly mesh

| Method | $T_{ave}(S)$ | $T_{sd}(S)$ |
|---|---|---|
| Simplygon[1] | 40.19 | 117.15 |
| Simplygon[2] | 5.67 | 3.95 |
| Ours[S] | 463.45 | 263.86 |
| QEM | 3.76 | 10.62 |
| Gao et al. | 649.00 | 1177.80 |
| PolyFit | 17.98 | 4.01 |
| Ours[P] | 505.01 | 250.83 |
| TetWild + QEM | 119.38 (119.23) | 264.21 (264.17) |

TABLE 6-continued

Time statistics of various methods to generate low-poly mesh

| Method | $T_{ave}(S)$ | $T_{sd}(S)$ |
|---|---|---|
| fTetWild + QEM | 25.10 (23.82) | 51.62 (50.58) |
| ManifoldPlus + QEM | 33.40 (17.97) | 29.23 (17.28) |
| Alpha Wrapping + QEM | 7.91 (5.67) | 5.75 (2.23) |
| Ours | 440.12 | 234.35 |

A performance analysis in terms of a user-specified screen size $n_p$ and a corresponding iso-values d ($d=l/n_p$) was conducted. Table 7 shows an average face number, timing, and visual metrics for 3 different choices of $n_p$. As shown in Table 7, an increased $n_p$ can improve a visual similarity between an output mesh and an input high-poly mesh. At the same time, the increased $n_p$ can cost more time and end up with a larger number of faces. An exemplary impact of the $n_p$ can also be shown in FIG. 12. As shown in FIG. 12, re-meshed results with respect to different user-specified distance tolerances are provided, where L is a diagonal length of a bounding box of input mesh. (•, •) denotes (face number, light field distance, time cost). A smaller tolerance (e.g., light field distance) can cause a better re-meshed result, but take more time.

Table 7 shows statistics for different input distance parameters, where L is the diagonal length of the bounding box of the input mesh. Decreasing the distance can result in a better re-meshing result, but lead to a larger face number and a slower solving speed.

TABLE 7

The statistics for different input distance parameters

| Distance | #F | $Time_{ave}(s)$ | $Time_{sd}(s)$ | $PSNR_{ave}$ | $PSNR_{sd}$ | $LF_{ave}$ | $LF_{sd}$ | $SD_{ave}$ | $SD_{sd}$ | $ND_{ave}$ | $ND_{ave}$ |
|---|---|---|---|---|---|---|---|---|---|---|---|
| $\frac{L}{50}$ | 139 | 30.40 | 8.82 | 20.67 | 2.26 | 1298.14 | 956.31 | 0.030 | 0.015 | 0.093 | 0.070 |
| $\frac{L}{100}$ | 408 | 99.92 | 39.13 | 22.45 | 2.33 | 656.88 | 320.81 | 0.014 | 0.0086 | 0.062 | 0.067 |
| $\frac{L}{200}$ | 1193 | 440.12 | 234.35 | 24.40 | 2.48 | 367.14 | 190.88 | 0.0065 | 0.0058 | 0.042 | 0.066 |

Figure 13:
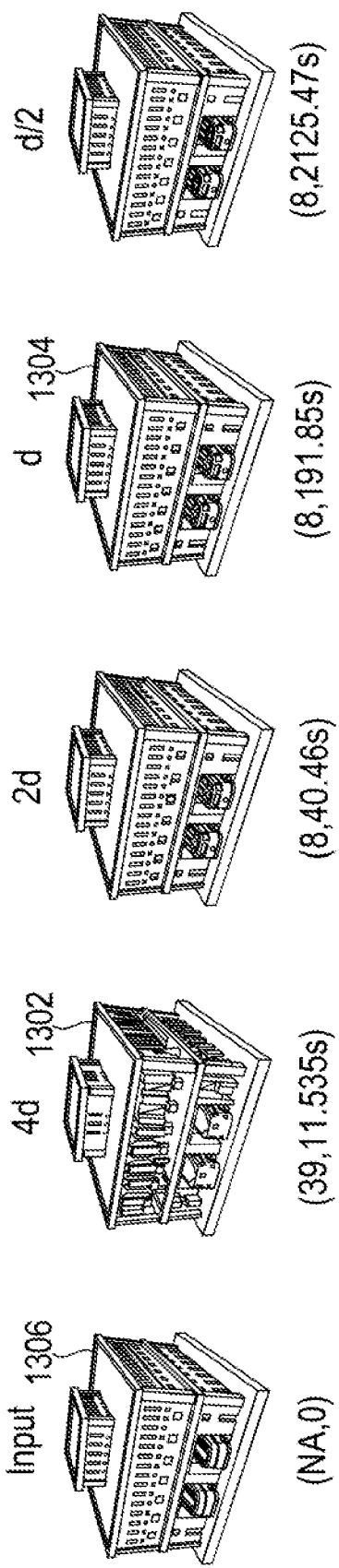
FIG. 13 shows exemplary comparisons of different re-meshed results based on different voxel sizes in accordance with some embodiments.

Given a screen size $n_p$, different voxel sizes can lead to different results. In FIG. 13, a comparison among extracted iso-surface results using different voxel sizes is provided. The comparison was performed based on a fixed iso-value $$d = \frac{l}{n_p},$$

where l is a diagonal length of a bounding box, and $n_p=200$. As shown in FIG. 13, a too large voxel may lead to a missing part of an extracted iso-surface (e.g., mesh (1302)), while a too small voxel size can slow down the extracting speed (e.g., mesh (1304)). In addition. a diagonal length of voxel that is set equal to an offset distance can provide a trade-off between efficiency and performance.

FIG. 13 shows different extracted iso-surfaces for a fixed offset distance using different voxel size. (•, •) denotes (#genus, time cost). "NA" means that the input mesh (1306) is non-manifold. The black bottom of the input mesh (1306) is due to an inversed face orientation (e.g., the bottom of the input mesh is inversed). As shown in FIG. 13, when a voxel size (diagonal length) is too large (=4d), a surface with a high genus can be obtained. As the voxel size decreases, finer details can be obtained but time efficiency can be reduced.

Figure 14:
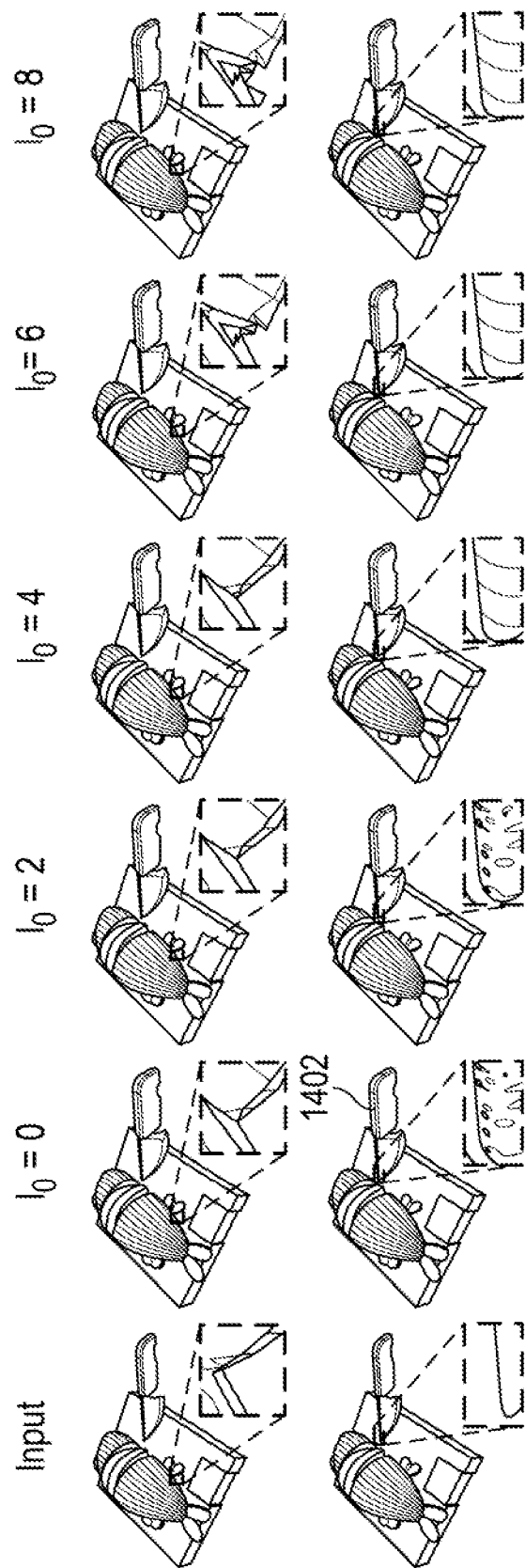
FIG. 14 shows exemplary comparisons of different re-meshed results based on different thresholds of a feature curve length in accordance with some embodiments.

FIG. 14 shows different iso-surface results based on different choices of a feature line length (or Feature Curve Length $l_0$). An increased feature line length can gradually solve the "saw-tooth" issue of the initial EMC33 surface (e.g., mesh (1402)). At the same time, the increased feature line length can blur some sharp features. In practice, $l_0$=4 is a trade-off choice. As shown in FIG. 14, different thresholds of the feature curve length l0 can lead to different results. The top and bottom rows present the same models with different rendering, where the bottom row smooths out a vertex normal by averaging adjacent face normals based on a vertex angle. A larger threshold smooths out the geometry (e.g., the black regions disappear), but at the same time, some of sharp features are blurred. l0=4, for example, was found to achieve a trade-off between smoothing the geometry and preserving the sharp features.

Figure 15:
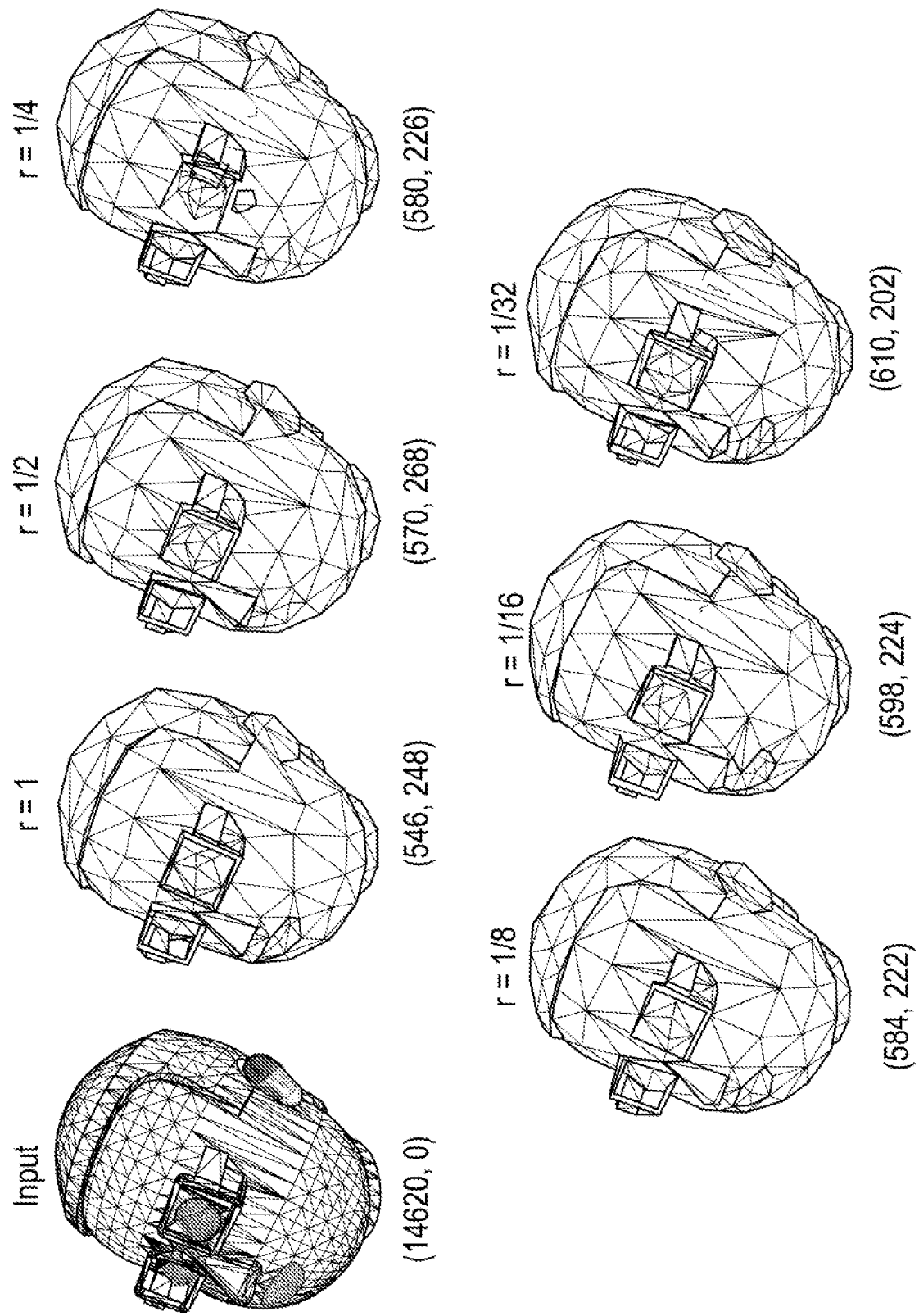
FIG. 15 shows exemplary comparisons of different re-meshed results based on different flow step fractional ratios in accordance with some embodiments.

FIG. 15 shows an exemplary impact of a flow step fractional ratio r. During the mesh flow process, the flow direction is multiplied by a ratio r to allow more moving space for the entire mesh and to achieve a better optimized result. In practice, a smaller step size can result in a better visual similarity (e.g., a smaller light field distance) between the output mesh $M_o$ and input mesh $M_i$. At the same time, $M_o$ can have a worse simplification ratio, that is, larger number of faces. In the disclosure, the ratio r is set as a default value of ⅛, since the default value can balance the simplification ratio and final visual similarities. As shown in FIG. 15, different results using different flow step fractional ratio r are provided. (•, •) denotes (#faces, light field distance). In general, decreasing r can lead to a smaller light field distance, but in turn, the decreased r can produce an output with a larger number of faces.

Figure 16:
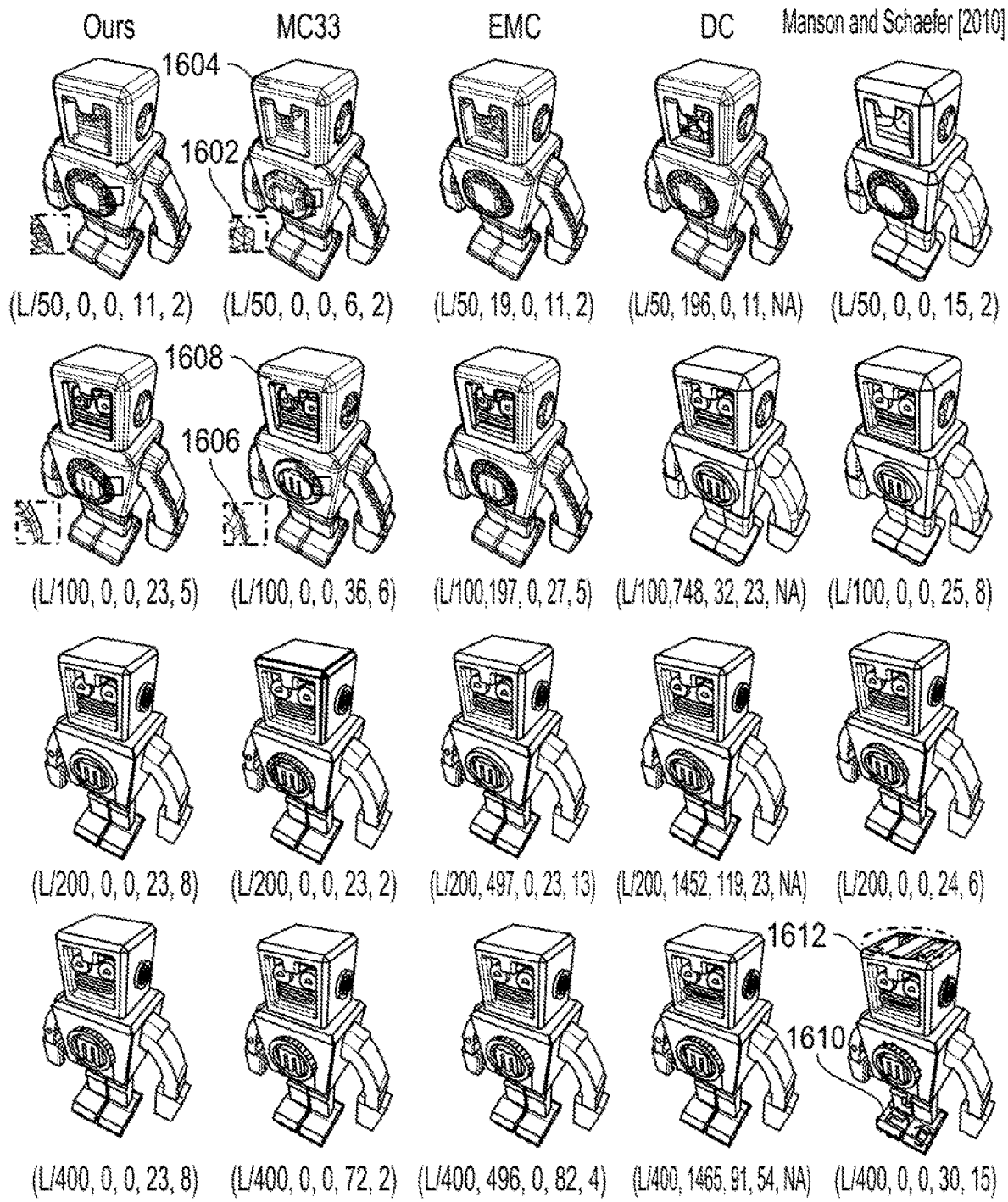
FIG. 16 shows exemplary comparisons of different re-meshed results based on different iso-surface extraction methods in accordance with some embodiments.

The mesh extraction step of the proposed algorithm in the disclosure can be independently useful, where many competing algorithms have been proposed in the past as shown in Table 1. An advantage of the proposed mesh extraction algorithm can be shown by comparing the proposed algorithm with: (1) Marching Cubes 33, (2) Extended Marching Cubes, (3) Dual Contouring, and (4) Manson and Schaefer's approach. The first three algorithms serve as baselines, and the last one meets all the desired properties listed in Table 1. In order to apply these algorithms to any input mesh $M_i$, the input mesh $M_i$ can be converted as an implicit function by equation (1) and corresponding Hermite data for Dual Contouring. The Extended Marching Cubes algorithm can be modified by implementation of the Marching Cubes 33, using the embedded Dual Contouring function, and choosing implementation of Manson and Schaefer to generate the corresponding results. FIG. 16 shows the extracted iso-surface in terms of the different iso-values: L 50, L 100, L 200 and L 400, where L is a diagonal length of BBox($M_i$). Among the examples in FIG. 16, a grid resolution is set based on Algorithm 1, except for Manson and Schaefer's approach, where the default octree settings are used. One thing to point out is that although the approaches in FIG. 16 generate reasonable results, related examples can suffer from several drawbacks. For example, Marching Cubes 33 can generate a closed and self-intersection-free manifold surface, but cannot capture the sharp features especially when grid resolution is low (e.g., a zoom-in region (1602) in mesh (1604), and a zoom-in region (1606) in mesh (1608)). Extended Marching Cubes and Dual Contouring recover the sharp features, but they either may lead to self-intersections or have no guarantees of the manifoldness and self-intersection-free property. Manson and Schaefer's approach may generate an iso-surface with an undesired high genus (e.g., a circled region (1610) in mesh (1612)).

Figure 17:
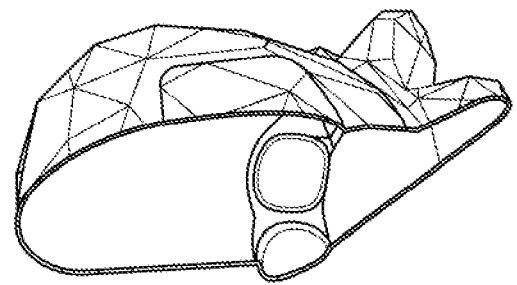
FIG. 17 shows an exemplary generated shell for a cartoon octopus.
Figure 17:
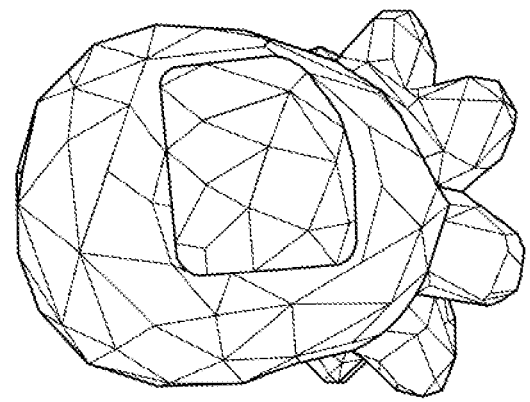
Figure 17:
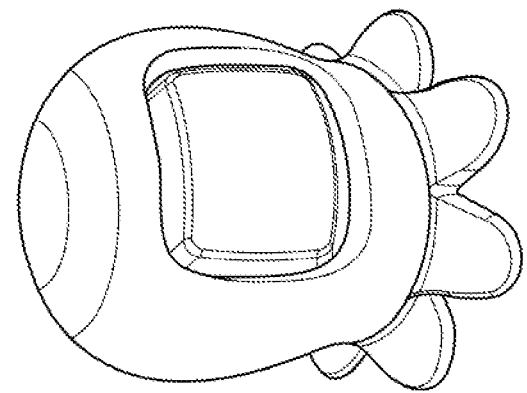

The re-meshing scheme of the disclosure can be easily adapted to generate cages of an input mesh, without any requirements for the cages to be manifold, watertight, or self-intersection-free. The cage mesh needs to be fully enclosed without penetrations of a 3D model. In order to make the cage mesh to be fully enclosed and free of penetrations, an intersection check can be added during a mesh optimization step of the disclosure. For example, every time when a vertex position is updated in the flow and alignment steps, the Algorithm 5 can be modified by adding one more intersection check between current mesh and the input mesh to reject any edge collapse that can lead to the intersection with the input mesh. The additional checks can be handled efficiently by classical BVH-based collision detection. FIG. 17 shows a cage generated by an algorithm of the disclosure, where the case is a generated shell for a cartoon octopus. Unlike a related automatic caging algorithm, such as provided by Sacht (e.g., Nested Cages, ACM Trans. Graph. 34, 6, Article 170 (November 2015), 14 pages), the algorithm of the disclosure makes no assumptions of the input mesh. For example, an input model in FIG. 17 has 32 non-manifold edges and 264 intersecting triangle pairs. To compare with the related algorithm of Sacht more thoroughly, both approaches were run to generate cages for a dataset containing meshes with clean topology and geometry, which is required by the related algorithm of Sacht's approach. Based on an author-provided code of Sacht, a cage with a $E_{varap}$ energy was generated. Both methods were run by setting the number of triangles of the final cage to be 2000 and with a time limit of 1 h. As shown in Table 8, the related solution of Sacht returns a run time error for 20 models and fails to produce any results within the time limit for 5 models. At the same time, the approach of the disclosure can successfully generate a tighter cage (e.g., a smaller Hausdorff distance). FIG. 18 shows addition visual comparisons.

FIG. 18 shows comparisons between the proposed method of the disclosure and the related Sacht example (•, •, •) denotes a Hausdorff distance (e.g., from a cage to an input, from an input to a cage, or between an input and a cage). As shown in FIG. 18, even if the input mesh (1802) is water-tight, the Sacht example may end up with a bad cage shape in the bottom row (e.g., meshes (1804), (1806) and (1808)).

Table 8 shows Hausdorff distance statistics. $d_{c \rightarrow i}$ is the Hausdorff distance from a generated cage to an input mesh, $d_{i \rightarrow c}$ is a distance from an opposite direction, and $d_H$ is a Hausdorff distance between the generated cage and the input mesh ($d_H$=max($d_{c \rightarrow i}$, $d_{i \rightarrow c}$)). $r_s$ is a successful ratio. The Sacht example failed to produce results for 20 out of 93 models due to the run time error, for 5 out of 93 models since exceeding the time threshold. Notice that, some of the cages generated by the Sacht example have suffer from extensive bad artifacts, which can be shown in FIG. 18 for example. Updated statistics after manually removing these models are provided in the last two rows of Table 8.

TABLE 8

Hausdorff distance statistics between proposed method and a Sacht method

| Method | $d_{c \rightarrow i}^{ave}$ | $d_{c \rightarrow i}^{sd}$ | $d_{i \rightarrow c}^{ave}$ | $d_{i \rightarrow c}^{sd}$ | $d_H^{ave}$ | $d_H^{sd}$ | $r_s$ |
|---|---|---|---|---|---|---|---|
| Ours | 0.21 | 0.58 | 0.20 | 0.53 | 0.22 | 0.59 | 100% |
| Sacht et al. | 1.11 | 7.17 | 38.03 | 306.89 | 38.03 | 306.89 | 73.1% |

TABLE 8-continued

Hausdorff distance statistics between proposed method and a Sacht method

| Method | $d_{c\to i}^{ave}$ | $d_{c\to i}^{sd}$ | $d_{i\to c}^{ave}$ | $d_{i\to c}^{sd}$ | $d_H^{ave}$ | $d_H^{sd}$ | $r_s$ |
|---|---|---|---|---|---|---|---|
| Ours* | 0.14 | 0.36 | 0.13 | 0.32 | 0.15 | 0.37 | 100% |
| Sacht et al. | 0.15 | 0.33 | 0.19 | 0.45 | 0.19 | 0.45 | 74.7% |

In the disclosure, a robust approach is provided to generate low-poly representations of any input mesh. The approach can be decomposed into two independently useful stages: (1) the iso-surface extraction stage, where a watertight, feature-preserving, and self-intersection-free iso-surface of the input mesh can be extracted with any user-specific iso-value, (2) a mesh-flow back stage, where re-meshing and flowing the extracted the surface are alternatively performed to meet desired properties: low-resolution and visually close to the input mesh. As shown in FIG. 11, the approach of the disclosure spends the majority of time (~80%) on the simplification and edge flip steps of the iso-surface extraction stage. These steps involve numerous intersection checks. Any parallel version of the simplification and edge flip steps may dramatically accelerate the process.

FIG. 19 shows a detailed lookup table for a proposed EMC33 algorithm mentioned in the mesh extraction. As shown in FIG. 19, 33 cases (or templates) of EMC 33 are provided. An additional point (e.g., (1906) in case 5 and (1908) in case 1) can be inserted for each component of a case. The cube vertices can be positive and negative. For example, in case 5, a cube vertex (1902) is positive and a cube vertex (1904) is negative. The surface-cube intersections on edges of a cube can be the iso-points, such as iso-point (1910) in case 3.1. In addition, case 12.2 and 12.3 are symmetric, as well as case 11 and case 14.

For the cases (e.g., case 3.1, and case 4.1.1) with more than one component, separating planes can be introduced, which divide the cube into several disjoint convex domains, and feature points can be solved within the corresponding domains based on equation (2), for example. The detailed separating policies can be shown in FIG. 20.

Figure 20:
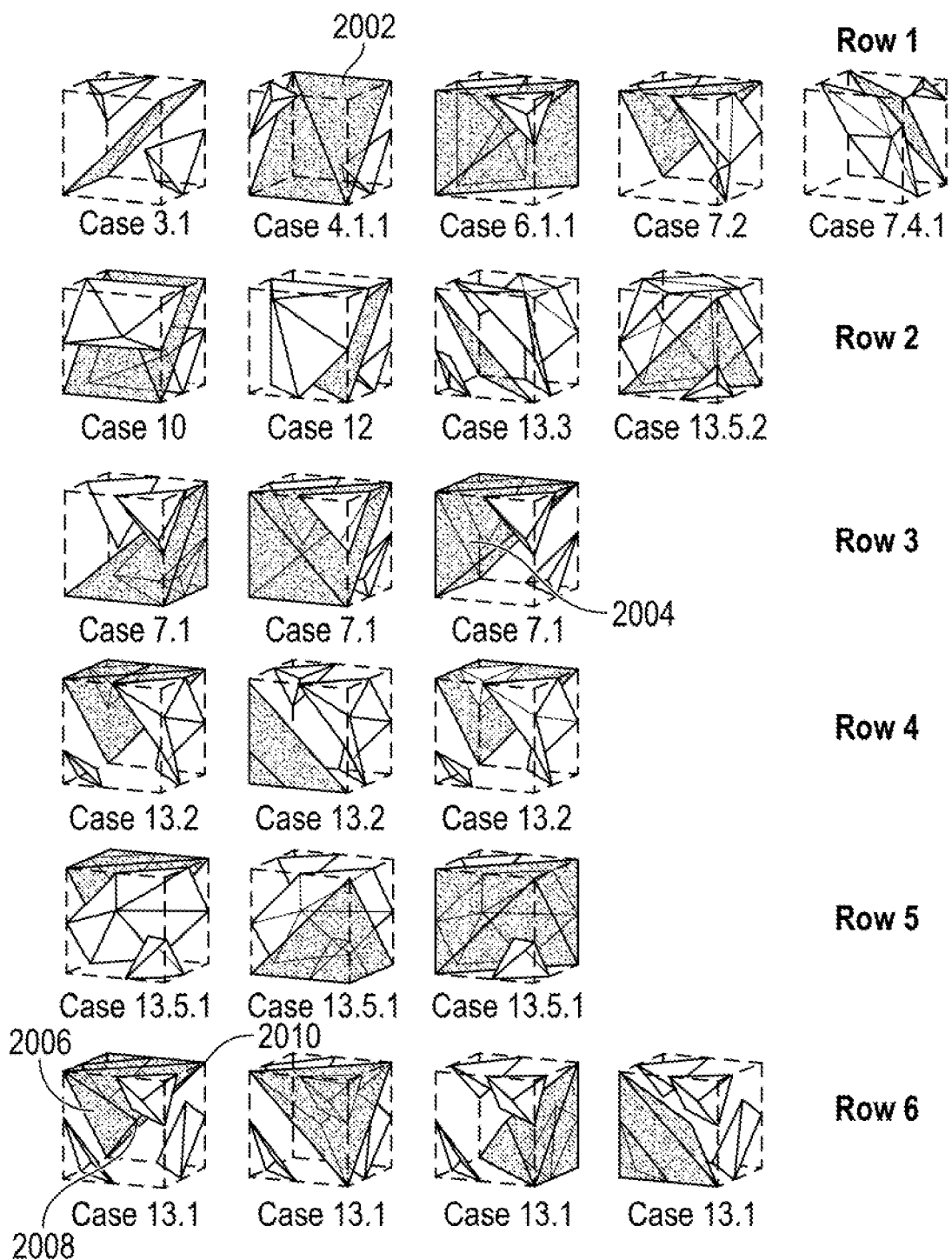
FIG. 20 is an exemplary illustration of separation polices for EMC 33.

As shown in FIG. 20, rows 1-2 are the cases with two components, where a plane (e.g., plane (2002)) can be formed by cube vertices to achieve division. Rows 3-5 are cases that have three components, where a separating polyhedron (e.g., (2004) in case 7.1) can be formed based on the cube vertices. For row 6, a separating polyhedron can be formed based on a cube center and cube vertices, where the cube center is an additional polyhedron vertex. As shown in case 13.1, a separating polyhedron (2006) can be formed based on cube center (2008) and cube vertices (e.g., (2010)).

Figure 21:
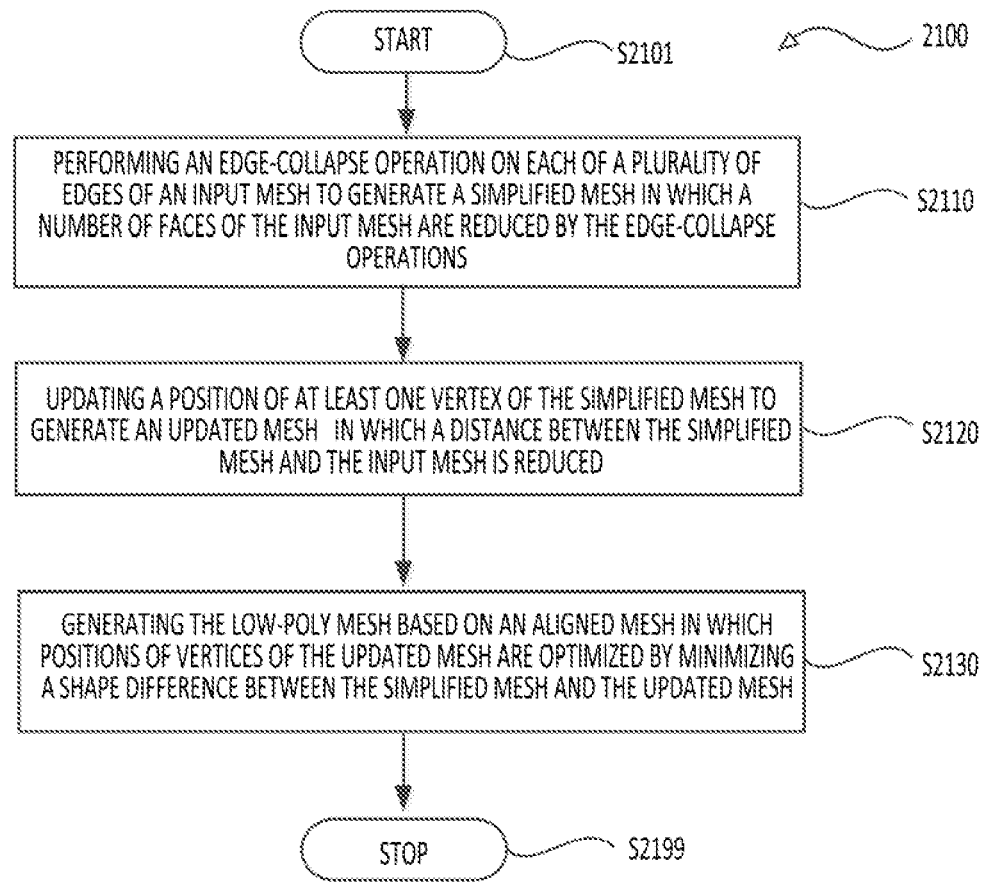
FIG. 21 shows a flow chart outlining an exemplary process to generate a low-poly mesh according to some embodiments of the disclosure.

FIG. 21 shows a flow chart outlining an exemplary process (2100) to generate a low-poly mesh according to some embodiments of the disclosure.

As shown in FIG. 21, the process (2100) can start from (S2101) and proceed to (S2110). At (S2110), an edge-collapse operation is performed on each of a plurality of edges of an input mesh to generate a simplified mesh in which a number of faces of the input mesh is reduced by the edge-collapse operations.

At (S2120), a position of at least one vertex of the simplified mesh is updated to generate an updated mesh in which a distance between the simplified mesh and the input mesh is reduced.

At (S2130), the low-poly mesh is generated based on an aligned mesh in which positions of vertices of the updated mesh are optimized by minimizing a shape difference between the simplified mesh and the updated mesh.

In an example, the input mesh is an iso-surface mesh that is generated based on a plurality of iso-surfaces in a plurality of voxels of the 3D model, where the plurality of iso-surfaces is determined based on an iso-value.

In an example, the edge-collapse operation is performed on a first edge of the plurality of edges of the input mesh to generate the simplified mesh. Whether the simplified mesh meets a topology consistency is determined based on whether the simplified mesh is manifold and watertight, and has a same genus and a same number of components as the input mesh. In response to the simplified mesh meeting the topology consistency, whether the simplified mesh is free of self-intersection is determined. In response to the simplified mesh being free of self-intersection, whether a first distance between a sub-mesh of the input mesh and a sub-mesh of the simplified mesh is larger than an iso-value is determined. The sub-mesh of the input mesh includes faces adjacent to the first edge before the edge-collapse operation, and the sub-mesh of the simplified mesh includes faces associated with the first edge after the edge-collapse operation. In response to the first distance being less than the iso-value, whether a second distance is less than a third distance is determined. The second distance is determined between the sub-mesh of the input mesh and a reference mesh. The third distance is determined between the sub-mesh of the simplified mesh and the reference mesh.

In some embodiments, a first sub-mesh in the simplified mesh that includes at least one first face is determined. Each of the at least one first face is in contact with a vertex that is determined when the edge-collapse operation is applied on the first edge. A second sub-mesh in the simplified mesh is determined. The second sub-mesh includes a plurality of second faces, where each of the plurality of second faces shares at least one vertex of the first sub-mesh. A third sub-mesh is determined in the simplified mesh, where the third sub-mesh includes a plurality of third faces that are not included in the first sub-mesh and the second sub-mesh. A BVH tree data structure of the third sub-mesh is constructed based on a BVH Tree type. For each of the one or more first faces of the first sub-mesh, a closest face of the respective first face is determined in the third sub-mesh. Whether each of the one or more first faces of the first sub-mesh intersects the closest face of the respective first face is further determined.

In some embodiments, a target vertex is determined in the input mesh that is a closest vertex of a first vertex of the simplified mesh. A vector between the target vertex and the first vertex is determined. The vector is equal to a difference between a position of the target vertex and a position of the first vertex over a first constant value. The first vertex is updated based on the vector and the position of the first vertex.

In an example, to update the first vertex, the position of the first vertex is updated as a sum of (i) the position of the first vertex and (ii) a product of a second constant value and the vector. Whether a first face of the simplified mesh that includes the first vertex intersects at least one neighboring face in the simplified mesh is determined. In response to the first face intersecting the at least one neighboring face, the position of the first vertex is updated as a sum of (i) the position of the first vertex and (ii) a product of a third constant value, a half of the second constant value, and the vector. In response to the first face not intersecting the at least one neighboring face, the position of the first vertex is updated as a sum of (i) the position of the first vertex and (ii) a product of the third constant value, the second constant value, and the vector.

In some embodiments, the first constant value is 8, the second constant value is 1, and the third constant value is 0.95.

In some embodiments, an unnormalized face normal of a first face of a face union is determined. The face union includes faces in the updated mesh and contacts a first vertex of the updated mesh. A normal constant is determined based on a magnitude of the unnormalized face normal of the first face. A unnormalized face normal of a corresponding face to the first face in the simplified mesh is determined. The optimized position of the first vertex is further determined by minimizing an unconstrained quadratic function.

In an example, the unnormalized face normal of the first face is determined as a cross product of two face edges of the first face.

In an example, the unnormalized face normal of the corresponding face to the first face is determined as a cross product of two face edges of the corresponding face to the first face.

In an example, the unconstrained quadratic function is $$E(v) := \Sigma_{f \in N(v)} \left\| \frac{n(f)}{c_n} - \frac{\tilde{n}(f)}{\|\tilde{n}(f)\|} \right\|^2.$$

The $c_n$ is the normal constant, $N(v)$ is the face union, $n(f)$ is the unnormalized face normal of the first face, and $\tilde{n}(f)$ is the unnormalized face normal of the corresponding face to the first face.

In some embodiments, a vector between a position of the first vertex and the optimized position of the first vertex is determined. The first vertex is further updated based on the determined vector to generate the aligned mesh.

In some embodiments, an iteration process is performed to generate the low-poly mesh. In response to one of (i) an iteration number of the iteration process being less than a target value, and (ii) a Hausdorff distance between the input mesh and the aligned mesh being less than a threshold value, an edge-collapse operation is performed on each of a plurality of edges of the aligned mesh to generate another simplified mesh.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
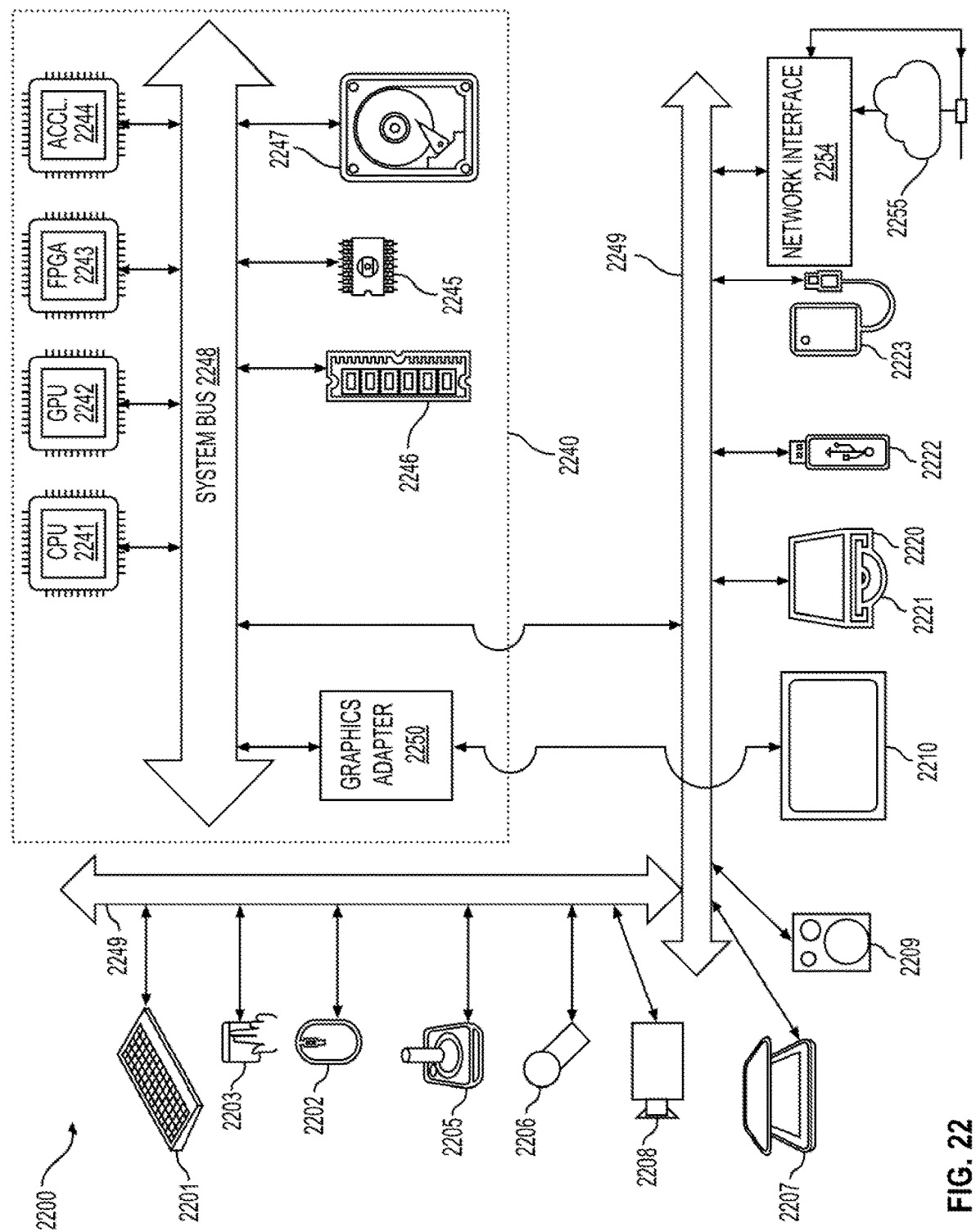
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hard-wired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of generating a low-poly mesh for a three-dimensional (3D) model, the method comprising:
    performing an edge-collapse operation on each of a plurality of edges of an input mesh to generate a simplified mesh in which a number of faces of the input mesh are reduced by the edge-collapse operations;
    updating a position of at least one vertex of the simplified mesh to generate an updated mesh in which a distance between the simplified mesh and the input mesh is reduced, wherein a position of a first vertex of the at least one vertex of the simplified mesh is updated based on vector information and the position of the first vertex, the vector information indicating a difference between a position of a target vertex in the input mesh and the position of the first vertex over a first constant value, the target vertex in the input mesh being a closest vertex of the first vertex of the simplified mesh; and
    generating the low-poly mesh based on an aligned mesh in which positions of vertices of the updated mesh are optimized by minimizing a shape difference between the simplified mesh and the updated mesh.

2. The method of claim 1, wherein the input mesh is an iso-surface mesh that is generated based on a plurality of iso-surfaces in a plurality of voxels of the 3D model, the plurality of iso-surfaces being determined based on an iso-value.

3. The method of claim 1, wherein the performing the edge-collapse operation further comprises:
    performing the edge-collapse operation on a first edge of the plurality of edges of the input mesh to generate the simplified mesh;
    determining whether the simplified mesh meets a topology consistency based on whether the simplified mesh is manifold and watertight, and has a same genus and a same number of components as the input mesh;
    in response to the simplified mesh meeting the topology consistency, determining whether the simplified mesh is free of self-intersection;
    in response to the simplified mesh being free of self-intersection, determining whether a first distance between a sub-mesh of the input mesh and a sub-mesh of the simplified mesh is larger than an iso-value, the sub-mesh of the input mesh including faces adjacent to the first edge before the edge-collapse operation, the sub-mesh of the simplified mesh including faces associated with the first edge after the edge-collapse operation; and in response to the first distance being less than the iso-value, determining whether a second distance between the sub-mesh of the input mesh and a reference mesh is less than a third distance between the sub-mesh of the simplified mesh and the reference mesh.

4. The method of claim 3, wherein the determining whether the simplified mesh is free of self-intersection further comprises:

determining a first sub-mesh in the simplified mesh that includes at least one first face, each of the at least one first face being in contact with a vertex that is determined when the edge-collapse operation is applied on the first edge;

determining a second sub-mesh in the simplified mesh, the second sub-mesh including a plurality of second faces, each of the plurality of second faces sharing at least one vertex of the first sub-mesh;

determining a third sub-mesh in the simplified mesh, the third sub-mesh including a plurality of third faces that are not included in the first sub-mesh and the second sub-mesh;

constructing a bounding volume hierarchy (BVH) tree data structure of the third sub-mesh based on a BVHTree type;

for each of the at least one first face of the first sub-mesh, determining a closest face of the respective first face in the third sub-mesh; and verifying whether each of the at least one first face of the first sub-mesh intersects the closest face of the respective first face.

5. The method of claim 1, wherein the updating the first vertex further comprises:

updating the position of the first vertex as a sum of (i) the position of the first vertex and (ii) a product of a second constant value and a vector indicated by the vector information;

determining whether a first face of the simplified mesh that includes the first vertex intersects at least one neighboring face in the simplified mesh;

in response to the first face intersecting the at least one neighboring face, updating the position of the first vertex as a sum of (i) the position of the first vertex and (ii) a product of a third constant value, a half of the second constant value, and the vector; and in response to the first face not intersecting the at least one neighboring face, updating the position of the first vertex as a sum of (i) the position of the first vertex and (ii) a product of the third constant value, the second constant value, and the vector.

6. The method of claim 5, wherein the first constant value is 8, the second constant value is 1, and the third constant value is 0.95.

7. The method of claim 1, wherein the generating further comprises:

determining an unnormalized face normal of a first face of a face union that includes faces in the updated mesh and contacts the first vertex of the updated mesh;

setting a normal constant based on a magnitude of the unnormalized face normal of the first face;

determining a unnormalized face normal of a corresponding face to the first face in the simplified mesh; and determining the optimized position of the first vertex that minimizes an unconstrained quadratic function.

8. The method of claim 7, wherein the determining the unnormalized face normal of the first face further comprises:

determining the unnormalized face normal of the first face as a cross product of two face edges of the first face.

9. The method of claim 8, wherein the determining the unnormalized face normal of the corresponding face to the first face further comprises:

determining the unnormalized face normal of the corresponding face to the first face as a cross product of two face edges of the corresponding face to the first face.

10. The method of claim 9, wherein the unconstrained quadratic function comprises:

$$E(v) := \Sigma_{f \in N(v)} \left\| \frac{n(f)}{c_n} - \frac{\tilde{n}(f)}{\|\tilde{n}(f)\|} \right\|^2$$

the $c_n$ being the normal constant, $N(v)$ being the face union, $n(f)$ being the unnormalized face normal of the first face, and $\tilde{n}(f)$ being the unnormalized face normal of the corresponding face to the first face.

11. The method of claim 7, wherein the generating the low-poly mesh further comprises:

determining a vector between the position of the first vertex and the optimized position of the first vertex; and updating the first vertex based on the determined vector to generate the aligned mesh.

12. The method of claim 11, wherein the generating the low-poly mesh further comprises:

performing an iteration process to generate the low-poly mesh, wherein the performing the iteration process further comprises:

in response to one of (i) an iteration number of the iteration process being less than a target value, and (ii) a Hausdorff distance between the input mesh and the aligned mesh being less than a threshold value, performing an edge-collapse operation on each of a plurality of edges of the aligned mesh to generate another simplified mesh.

13. An apparatus for generating a low-poly mesh for a three-dimensional (3D) model, the apparatus comprising:

processing circuitry configured to:

perform an edge-collapse operation on each of a plurality of edges of an input mesh to generate a simplified mesh in which a number of faces of the input mesh are reduced by the edge-collapse operations;

update a position of at least one vertex of the simplified mesh to generate an updated mesh in which a distance between the simplified mesh and the input mesh is reduced, wherein a position of a first vertex of the at least one vertex of the simplified mesh is updated based on vector information and the position of the first vertex, the vector information indicating a difference between a position of a target vertex in the input mesh and the position of the first vertex over a first constant value, the target vertex in the input mesh being a closest vertex of the first vertex of the simplified mesh; and generate the low-poly mesh based on an aligned mesh in which positions of vertices of the updated mesh are optimized by minimizing a shape difference between the simplified mesh and the updated mesh.

14. The apparatus of claim 13, wherein the input mesh is an iso-surface mesh that is generated based on a plurality of iso-surfaces in a plurality of voxels of the 3D model, the plurality of iso-surfaces being determined based on an iso-value.

15. The apparatus of claim 13, wherein the processing circuitry is further configured to:
   perform the edge-collapse operation on a first edge of the plurality of edges of the input mesh to generate the simplified mesh;
   determine whether the simplified mesh meets a topology consistency based on whether the simplified mesh is manifold and watertight, and has a same genus and a same number of components as the input mesh;
   in response to the simplified mesh meeting the topology consistency, determine whether the simplified mesh is free of self-intersection;
   in response to the simplified mesh being free of self-intersection, determine whether a first distance between a sub-mesh of the input mesh and a sub-mesh of the simplified mesh is larger than an iso-value, the sub-mesh of the input mesh including faces adjacent to the first edge before the edge-collapse operation, the sub-mesh of the simplified mesh including faces associated with the first edge after the edge-collapse operation; and
   in response to the first distance being less than the iso-value, determine whether a second distance between the sub-mesh of the input mesh and a reference mesh is less than a third distance between the sub-mesh of the simplified mesh and the reference mesh.

16. The apparatus of claim 15, wherein the processing circuitry is further configured to:
   determine a first sub-mesh in the simplified mesh that includes at least one first face, each of the at least one first face being in contact with a vertex that is determined when the edge-collapse operation is applied on the first edge;
   determine a second sub-mesh in the simplified mesh, the second sub-mesh including a plurality of second faces, each of the plurality of second faces sharing at least one vertex of the first sub-mesh;
   determine a third sub-mesh in the simplified mesh, the third sub-mesh including a plurality of third faces that are not included in the first sub-mesh and the second sub-mesh;
   construct a bounding volume hierarchy (BVH) tree data structure of the third sub-mesh based on a BVHTree type;
   for each of the at least one first face of the first sub-mesh, determine a closest face of the respective first face in the third sub-mesh; and
   verify whether each of the at least one first face of the first sub-mesh intersects the closest face of the respective first face.

17. The apparatus of claim 13, wherein the processing circuitry is further configured to:
   update the position of the first vertex as a sum of (i) the position of the first vertex and (ii) a product of a second constant value and a vector indicated by the vector information;
   determine whether a first face of the simplified mesh that includes the first vertex intersects at least one or neighboring face in the simplified mesh;
   in response to the first face intersecting the at least one neighboring face, update the position of the first vertex as a sum of (i) the position of the first vertex and (ii) a product of a third constant value, a half of the second constant value, and the vector; and
   in response to the first face not intersecting the at least one neighboring face, update the position of the first vertex as a sum of (i) the position of the first vertex and (ii) a product of the third constant value, the second constant value, and the vector.

18. The apparatus of claim 13, wherein the processing circuitry is further configured to:
   determine an unnormalized face normal of a first face of a face union that includes faces in the updated mesh and contacts the first vertex of the updated mesh;
   set a normal constant based on a magnitude of the unnormalized face normal of the first face;
   determine a unnormalized face normal of a corresponding face to the first face in the simplified mesh; and
   determine the optimized position of the first vertex that minimizes an unconstrained quadratic function.

* * * * *